(12) United States Patent
Oka et al.

(10) Patent No.: US 10,907,236 B2
(45) Date of Patent: Feb. 2, 2021

(54) COLD ROLLED STEEL SHEET FOR DRAWN CAN AND METHOD FOR MANUFACTURING SAME

(71) Applicant: NIPPON STEEL CORPORATION, Tokyo (JP)

(72) Inventors: Masaharu Oka, Tokyo (JP); Nobusato Kojima, Tokyo (JP); Yuta Dairokuno, Tokyo (JP); Michihiro Nono, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/606,118

(22) PCT Filed: Apr. 19, 2018

(86) PCT No.: PCT/JP2018/016191
§ 371 (c)(1),
(2) Date: Oct. 17, 2019

(87) PCT Pub. No.: WO2018/194135
PCT Pub. Date: Oct. 25, 2018

(65) Prior Publication Data
US 2020/0048730 A1 Feb. 13, 2020

(30) Foreign Application Priority Data
Apr. 19, 2017 (JP) .................. 2017-083214

(51) Int. Cl.
*B32B 15/01* (2006.01)
*C21D 9/46* (2006.01)
(Continued)

(52) U.S. Cl.
CPC .................. *C21D 9/46* (2013.01); *B32B 1/08* (2013.01); *B32B 15/011* (2013.01);
(Continued)

(58) Field of Classification Search
CPC .......... C21D 9/46; C21D 6/005; C21D 6/008; C21D 8/0205; C21D 8/0236;
(Continued)

(56) References Cited

U.S. PATENT DOCUMENTS

2014/0363695 A1* 12/2014 Kimura .................. C22C 38/16
428/659
2016/0160308 A1 6/2016 Saito et al.

FOREIGN PATENT DOCUMENTS

JP 6-2104 A 1/1994
JP 3516813 B2 4/2004
(Continued)

OTHER PUBLICATIONS

Machine Translation, Oka et al., JP 2017-190469, Oct. 2017. (Year: 2017).*
(Continued)

*Primary Examiner* — Michael E. La Villa
(74) *Attorney, Agent, or Firm* — Birch, Stewart, Kolasch & Birch, LLP

(57) ABSTRACT

A steel sheet for a drawn can has a predetermined chemical composition and has a ferrite single-phase structure with a crystal grain size number of 11.0 or more, the sheet thickness is 0.15 to 0.50 mm, in an L direction of the steel sheet after an ageing treatment at 100° C. for one hour, an yield strength YP is 220 to 290 MPa, a tensile strength TS is 330 to 390 MPa, a total elongation EL is 32% or more, an yield point elongation YP-EL is 0%, an average plastic strain ratio $r_m$ is more than 1.35, and an in-plane anisotropy $\Delta r$ is −0.30 to +0.15.

12 Claims, 1 Drawing Sheet

(51) Int. Cl.
| | |
|---|---|
| *C21D 8/02* | (2006.01) |
| *C21D 6/00* | (2006.01) |
| *C22C 38/14* | (2006.01) |
| *C22C 38/12* | (2006.01) |
| *C22C 38/06* | (2006.01) |
| *C22C 38/04* | (2006.01) |
| *C22C 38/02* | (2006.01) |
| *C22C 38/00* | (2006.01) |
| *C22C 38/60* | (2006.01) |
| *B32B 15/04* | (2006.01) |
| *C22C 38/48* | (2006.01) |
| *B32B 1/08* | (2006.01) |
| *C22C 38/26* | (2006.01) |
| *B32B 15/18* | (2006.01) |
| *C23C 2/28* | (2006.01) |
| *C23C 28/02* | (2006.01) |
| *C23C 30/00* | (2006.01) |
| *C23C 2/04* | (2006.01) |
| *C23C 2/08* | (2006.01) |
| *C23C 2/40* | (2006.01) |

(52) U.S. Cl.
CPC .......... *B32B 15/013* (2013.01); *B32B 15/015* (2013.01); *B32B 15/04* (2013.01); *B32B 15/043* (2013.01); *B32B 15/18* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C22C 38/26* (2013.01); *C22C 38/48* (2013.01); *C22C 38/60* (2013.01); *C23C 2/04* (2013.01); *C23C 2/08* (2013.01); *C23C 2/28* (2013.01); *C23C 2/40* (2013.01); *C23C 28/02* (2013.01); *C23C 28/021* (2013.01); *C23C 28/023* (2013.01); *C23C 30/00* (2013.01); *C23C 30/005* (2013.01); *C21D 2211/005* (2013.01); *Y10T 428/12722* (2015.01); *Y10T 428/12757* (2015.01); *Y10T 428/12799* (2015.01); *Y10T 428/12937* (2015.01); *Y10T 428/12944* (2015.01); *Y10T 428/12958* (2015.01); *Y10T 428/12965* (2015.01); *Y10T 428/12972* (2015.01); *Y10T 428/2495* (2015.01); *Y10T 428/24967* (2015.01); *Y10T 428/24975* (2015.01); *Y10T 428/26* (2015.01); *Y10T 428/263* (2015.01); *Y10T 428/264* (2015.01); *Y10T 428/265* (2015.01); *Y10T 428/27* (2015.01)

(58) Field of Classification Search
CPC . C21D 2211/005; C21D 8/0226; C22C 38/00; C22C 38/60; C22C 38/001; C22C 38/002; C22C 38/02; C22C 38/04; C22C 38/06; C22C 38/12; C22C 38/14; C22C 38/004; C22C 38/26; C22C 38/48; C23C 2/04; C23C 2/08; C23C 2/28; C23C 2/40; C23C 28/02; C23C 28/021; C23C 28/023; C23C 30/00; C23C 30/005; Y10T 428/12722; Y10T 428/12757; Y10T 428/12799; Y10T 428/12937; Y10T 428/12944; Y10T 428/12958; Y10T 428/12972; Y10T 428/12965; Y10T 428/2495; Y10T 428/24967; Y10T 428/24975; Y10T 428/26; Y10T 428/263; Y10T 428/264; Y10T 428/265; Y10T 428/27; B32B 15/015; B32B 15/011; B32B 15/04; B32B 15/043; B32B 15/18; B32B 15/013; B32B 1/08
See application file for complete search history.

(56) References Cited

FOREIGN PATENT DOCUMENTS

| | | |
|---|---|---|
| JP | 3996754 B2 | 10/2007 |
| JP | 4374126 B2 | 12/2009 |
| JP | 5359709 B2 | 12/2013 |
| JP | 2014-47359 A | 3/2014 |
| JP | 2016-130361 A | 7/2016 |
| JP | 2016-160438 A | 9/2016 |
| JP | 2017-190469 A | 10/2017 |
| WO | WO 2015/008454 A1 | 1/2015 |

OTHER PUBLICATIONS

"Metallic materials—Tensile testing—Method of test at room temperature", JIS Z 2241, 2011, total 37 pages.
"Metallic materials Sheet and strip Determination of plastic strain ratio", JIS Z 2254, 2008, total 77 pages.
"Steels—Micrographic determination of the apparent grain size", JIS G 0551, 2013, total 90 pages.
i"Test pieces for tensile test for metallic materials", JIS Z 2201, 1998, total 6 pages, (Feb. 1998).
International Search Report for PCT/JP2018/016191 dated Jul. 24, 2018.
Written Opinion of the International Searching Authority for PCT/JP2018/016191 (PCT/ISA/237) dated Jul. 24, 2018.

* cited by examiner

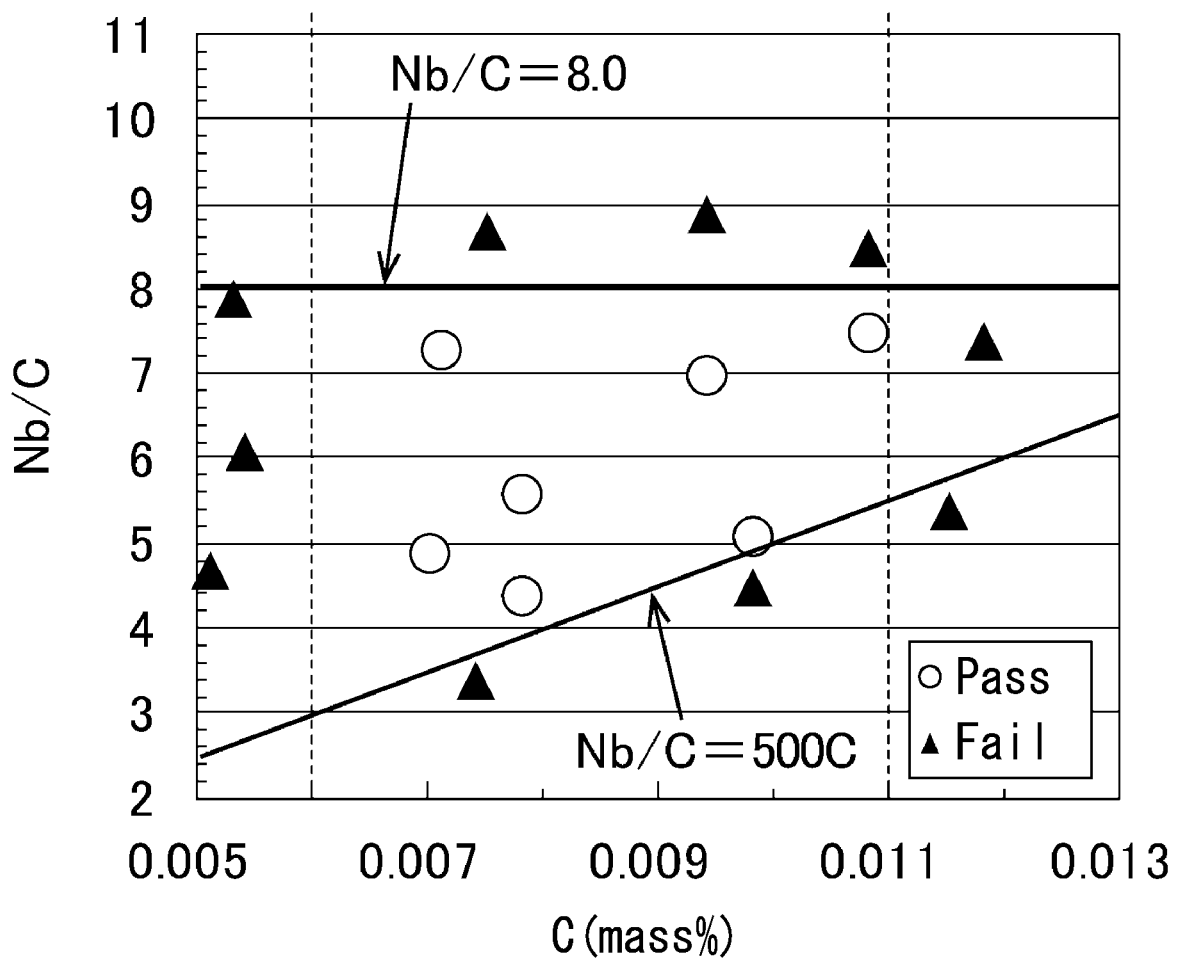

COLD ROLLED STEEL SHEET FOR DRAWN CAN AND METHOD FOR MANUFACTURING SAME

TECHNICAL FIELD OF THE INVENTION

The present invention relates to a cold rolled steel sheet for a drawn can and a method for manufacturing the same.

Priority is claimed on Japanese Patent Application No. 2017-083214, filed in Japan on Apr. 19, 2017, the content of which is incorporated herein by reference.

RELATED ART

Battery cans of D batteries to N batteries, button batteries, large-sized hybrid batteries, and the like or a variety of containers are manufactured by carrying out harsh multiple stages of drawing, drawing and ironing (DI: drawing ironing), or the like on a cold rolled steel sheet or on a cold rolled plated steel sheet obtained by carrying out a variety of plating such as Ni plating. Ni diffusion plating, Sn plating, and tinfree steel (TFS) plating (a plating made up of two layers of a metallic Cr layer and a Cr hydrated oxide layer) on the surface of the cold rolled steel sheet (hereinafter, collectively referred to as a cold rolled steel sheet in some cases, including a cold rolled steel sheet having a plating). Alternatively, a can of a cold rolled steel sheet without plating is manufactured, and then a variety of plating such as Ni plating, Sn plating, and TFS plating or painting is carried out thereon, thereby producing a can container.

Principal characteristics demanded for a cold rolled steel sheet that is used for the above-described can container are (1) press formability (a capability of being formed without generating a defect such as cracking during working), (2) surface roughening resistance (a property of being roughened on the surface only to a small extent after press forming), (3) earing resistance (low anisotropy of a material and a property of suppressing the occurrence of earing to a small extent after deep drawing), and (4) a non-ageing property (a property of preventing the generation of stretcher strains during drawing).

For battery cans that are used for hybrid cars and the like, performance improvement is being demanded more and more, and a steel sheet capable of withstanding harsher pressing is in demand. In order for the above-described performance improvement, a cold rolled steel sheet that is excellent in terms of press formability, has a high average plastic strain ratio $r_m$ and a small $|\Delta r|$ (absolute value of $\Delta r$), has non-ageing property, and is excellent in terms of surface roughening resistance is in demand.

Cold rolled steel sheets for a drawn can of the related art are disclosed by, for example, Japanese Patent No. 3516813 (Patent Document 1), Japanese Patent No. 3996754 (Patent Document 2), Japanese Patent No. 4374126 (Patent Document 3), and Japanese Patent No. 5359709 (Patent Document 4).

Patent Document 1 discloses a steel sheet for a drawn can having a composition containing C: ≤0.0030 wt %, Si: ≤0.05 wt %, Mn: ≤0.5 wt %, P: ≤0.03 wt %, S: ≤0.020 wt %, sol. Al: 0.01 to 0.100 wt %, N: ≤0.0070 wt %, Ti: 0.01 to 0.050 wt %, Nb: 0.008 to 0.030 wt %, and B: 0.0002 to 0.0007 wt % with a remainder being Fe and a unavoidable impurity, in which a crystal grain size No. is 10.0 or higher, and HR30T is 47 to 57. Patent Document 1 states that the steel sheet for a drawn can is capable of suppressing a surface defect.

Patent Document 2 discloses a steel sheet for a drawn can having a composition containing C: 0.0050 to 0.0170%, Si: ≤0.35%, Mn: ≤1.0%. P: ≤0.020%, S: ≤50.025%, sol. Al: 0.005 to 0.100%, N: ≤0.0070%, and Ti: (6 to 20)×C % with a remainder being Fe and a unavoidable impurity, in which the $\Delta r$ value is in a range of +0.15 to −0.12, an average r value≥1.20, GS. No of a recrystallized grain is 8.5 to 11.0, and the earing ratio is 1.0% or less.

Patent Document 3 discloses a steel sheet for a drawn can having a composition containing, by mass %, C: 0.045 to 0.100%, Si: ≤0.35%, Mn: ≤1.0%, P: ≤0.070%, S: ≤0.025%, sol. Al: 0.005 to 0.100%, N: ≤0.0060%, and B: B/N=0.5 to 2.5 with a remainder being Fe and a unavoidable impurity, in which a sheet thickness t is 0.15 to 0.60 mm, a $\Delta r$ value is in a range of +0.15 to −0.08, and a crystal orientation of the steel sheet is randomized by setting a heating rate during recrystallization annealing to 5° C./sec or faster. Patent Document 3 states that the steel sheet for a drawn can is excellent in terms of, particularly, an earing ratio.

Patent Document 4 discloses a steel sheet for a drawn can having a composition containing, by mass %, C: 0.0035 to 0.0080%, Si: ≤0.35%, Mn: ≤1.0%, P: ≤0.030%, S: ≤0.025%, sol. Al: 0.003 to 0.100%, N: ≤0.0100%, and Nb≤0.040% and (3 to 6)×C % with a remainder being Fe and a unavoidable impurity, in which a $\Delta r$ value is +0.15 to −0.15, an average r value: 1.00 to 1.35, GS. No of a recrystallized grain: 11.0 to 13.0, and an earing ratio: 2.5% or less. Patent Document 4 states that the steel sheet for a drawn can is excellent in terms of earing resistance and a surface quality after drawing.

However, the crystal grain size number of the cold rolled steel sheet of Patent Document 1 is 10.3 to 10.9 (refer to Table 2 in Patent Document 1), the crystal grain size number of the cold rolled steel sheet of Patent Document 2 is 8.8 to 10.8 (refer to Table 2 in Patent Document 2). The grain diameters are large in both of the cold rolled steel sheets. Surface roughening resistance deteriorates more as crystal grains become larger, and thus the cold rolled steel sheets disclosed by these patent documents have a problem with surface roughening resistance.

Patent Document 3 discloses that the obtained steel sheet for a drawn can is excellent in terms of earing resistance, but does not disclose anything about the crystal grain size number. In addition, the steel sheet is low carbon steel, and thus the average plastic strain ratio $r_m$ is assumed to be a value as low as approximately 1.0.

The crystal grain size number of the cold rolled steel sheet of Patent Document 4 is 11.6 to 12.1 (refer to Table 2 in Patent Document 4), which is fine, but the average r value is as low as 1.05 to 1.35 (refer to Table 2 in Patent Document 4). Therefore, the press formability is considered to be poor.

As described above, in the related art, it was difficult to obtain a steel sheet for which press formability (drawability) and surface roughening resistance are improved at the same time and, furthermore, which has favorable earing resistance and a favorable non-ageing property.

The grain size number is defined by an equation described below in JIS G 0551 (2013), and the grain size number increases as the crystal grain diameter decreases. Here, m represents the average number of crystal grains per square meter of a cross section of a test piece, and G represents the grain size number.

$$m = 8 \times 2^G$$

In addition, in the case of assuming a use for a battery can or the like, a steel sheet obtained by carrying out Ni plating on a steel sheet is often used for a drawn can. Ni-plated steel sheets are used as a variety of battery cases for an alkali manganese dry battery, a lithium ion battery, a nickel hydrogen battery, and the like due to the excellent chemical stability of Ni. In recent years, as a Ni plating method for a battery can, a method, in which Ni plating is carried out in advance on a steel strip to be used for the can manufacturing, has been used instead of a conventional Ni plating method for a battery can, in which a barrel plating is carried out after the can manufacturing. The case of carrying out Ni plating in advance is better than the case of barrel plating after the can manufacturing from the viewpoint of manufacturing costs or plating uniformity. However, for Ni-plated steel sheets that Ni plating is carried out before the can manufacturing, there is a case where cracks are generated in the Ni-plated layer due to working during the can manufacturing or a plated coating is peeled. These cracks or peeling result in the degradation of corrosion resistance.

With respect to the above-described problem, for example. Patent Document 5 (Japanese Unexamined Patent Application, First Publication No. H6-2104) discloses a highly corrosion-resistant Ni-plated steel strip for which a Ni plating having a plated layer thickness of 1 to 5 μm is formed on a cold rolled steel sheet and then thermally treated at a low temperature (450° C. to 680° C.) for a long period of time (6 to 13 hr.), thereby turning the Ni-plated layer into a Fe—Ni diffusion layer.

When the thermal treatment after the Ni plating is carried out a Fe—Ni diffusion alloy layer is formed in the interface between the Ni plating and the steel sheet, thereby improving the adhesion of the plated layer (hereinafter, a steel sheet having a Fe—Ni diffusion alloy layer at least in the interface between a Ni plating and the steel sheet formed by thermally treating a Ni-plated steel sheet will be referred to as a Ni diffusion plated steel sheet). In addition, the Ni-plated layer in which Fe does not diffuse, but remains in a surface layer turns into a recrystallized soft Ni-plated layer and does not easily crack during working. Therefore, it is possible to decrease the area of the base metal steel sheet exposed after working. On the other hand, the recrystallized soft Ni-plated layer is likely to cause seizure on to a die during pressing and degrades productivity in some cases.

As a result of research, the present inventors found that, under a thermal treatment condition of Patent Document 5, there is a high possibility that the above-described recrystallized soft Ni-plated layer remains.

In order to suppress the seizure of Ni-plated layer on a die, it is necessary to diffuse Fe up to the surface layer. Patent Document 6 (Japanese Unexamined Patent Application, First Publication No. 2014-47359) discloses a surface-treated steel sheet for a battery container having a Fe—Ni diffusion layer formed by forming a Ni-plated layer at least on a surface of the steel sheet which becomes an inner surface side of the battery container and then carrying out a thermal diffusion treatment thereon, in which a ratio of Ni to Fe in an outermost layer of the Fe—Ni diffusion layer is 7.5 or less in terms of the molar ratio of Ni/Fe, and a thickness of the Fe—Ni diffusion layer is 0.6 μm or more. It is described that this surface-treated steel sheet is capable of suppressing the elution of Fe or Ni into a non-aqueous electrolytic solution and capable of effectively preventing the occurrence of pitting corrosion or liquid leakage and the degradation of battery characteristics when used as a battery container of a battery when a non-aqueous electrolytic solution is used as an electrolytic solution.

Patent Document 6 states that the thickness of the Ni-plated layer before the thermal diffusion treatment is preferably 1.0 μm or less (8.9 g/m² or less in terms of the adhesion amount of Ni). As the reason therefor, Patent Document 6 states that, when the thickness of the Ni-plated layer is 1.0 pun or less, it is possible to diffuse Fe up to the outermost layer in the case of continuously annealing the surface-treated steel sheet under conditions of a thermal treatment temperature of 700° C. to 800° C. and a thermal treatment time of 10 to 300 seconds; however, when the thickness of the Ni-plated layer is more than 1.0 μm, in the case of continuously annealing the surface-treated steel sheet under the above-described conditions, Ni that does not form an alloy with Fe remains in a surface layer portion of the plating.

In recent years, in association with the distribution of the Ni diffusion plated-steel sheet, there has been a potential demand for a Ni diffusion-plated steel sheet that contains a certain concentration or more of Fe in an outermost surface portion of a plated layer, and has an adhesion amount of Ni of 9.0 g/m² or more while having excellent formability (including earing resistance) and surface roughening resistance as a steel sheet for a can. However, in Patent Document 6, a Ni diffusion plating in which the adhesion amount of Ni is 9.0 g/m² or more and Fe diffuses up to the surface cannot be obtained.

In addition, in the case of attempting to manufacture a Ni diffusion plated-steel sheet in which Fe diffuses up to the surface layer of a Ni-plated layer, the recrystallization condition of a steel sheet base metal and the mutual diffusion condition of Ni and Fe do not necessarily coincide with each other. Under a thermal treatment condition under which the grain growth of the base metal is suppressed to an optimal extent, there is a problem in that Ni that does not form any alloys remains in a surface layer portion of a thick Ni plating. The above-described problem becomes more serious as the adhesion amount of a Ni plating included in a cold rolled steel sheet (the steel sheet is not yet annealed) increases.

Patent Document 6 does not sufficiently take the control of the crystal grain size of the base metal into account.

PRIOR ART DOCUMENT

Patent Document

[Patent Document 1] Japanese Patent No. 3516813
[Patent Document 2] Japanese Patent No. 3996754
[Patent Document 3] Japanese Patent No. 4374126
[Patent Document 4] Japanese Patent No. 5359709
[Patent Document 5] Japanese Unexamined Patent Application, First Publication No. H6-2104
[Patent Document 6] Japanese Unexamined Patent Application. First Publication No. 2014-47359

DISCLOSURE OF THE INVENTION

Problems to be Solved by the Invention

An object of the present invention is to provide a cold rolled steel sheet for a drawn can which is excellent in terms of press formability (drawability), surface roughening resistance of a can, and earing resistance and has non-ageing property.

Means for Solving the Problem (1) A steel sheet for a drawn can according to an aspect of the present invention, as a chemical composition, contains, by mass %, C: 0.0060% to 0.0110%, Si: 0.50% or less, Mn: 0.70% or less, P: 0.070% or less, S: 0.050% or less, Sol. Al: 0.005% to 0.100%, N: less than 0.0025%, Nb satisfying Expression (1), B: 0% to 0.0030%, and Ti: 0% to 0.035% with a remainder of Fe and an impurity, has a ferrite single-phase structure with a crystal grain size number of 11.0 or more, a sheet thickness is 0.15 to 0.50 mm, in an L direction of the steel sheet after an ageing treatment at 100° C. for one hour, a yield strength YP is 220 to 290 MPa, a tensile strength TS is 330 to 390 MPa, a total elongation EL is 32% or more, and a yield point elongation YP-EL is 0%, and in the steel sheet after the ageing treatment at 100° C. for one hour, an average plastic strain ratio $r_m$ is more than 1.35 and an in-plane anisotropy $\Delta r$ is −0.30 to +0.15.

$$500 \times C \leq Nb/C \leq 8.0 \quad (a)$$

Here, to element symbols in Expression (a), the amounts (% by mass) of the corresponding elements are assigned.

(2) The cold rolled steel sheet for a drawn can according to (1), may further include: any one of the group consisting of a Ni-plated layer, a Ni diffusion plated layer, a Sn-plated layer, and a tinfree steel (TFS)-plated layer on a surface.

(3) The cold rolled steel sheet for a drawn can according to (2) may include a Ni diffusion plated layer having an adhesion amount of Ni of 9.0 to 27.0 g/m², in which, in the case of analyzing a concentration of Fe in a surface layer of the Ni diffusion plated layer by XPS, the concentration of Fe may be 3% to 80% by mass %.

(4) The cold rolled steel sheet for a drawn can according to (2) may include a Ni diffusion plated layer having an adhesion amount of Ni of 9.0 to 22.5 g/m², in which, in the case of analyzing a concentration of Fe in a surface layer of the Ni diffusion plated layer by XPS, the concentration of Fe may be 3% to 80% by mass %.

(5) A method for manufacturing a steel sheet for a drawn can according to another aspect of the present invention is a method for manufacturing the steel sheet for a drawn can according to (1), the method including: heating a cast piece having the chemical composition according to (1) to 1,000° C. to 1,280° C. carrying out a finish rolling at a rolling finish temperature of 870° C. to 960° C., cooling the finish rolled cast piece after finish rolling, and coiling the finish rolled cast piece at 450° C. or higher and lower than 700° C., thereby manufacturing a hot rolled steel sheet; carrying out a cold rolling on the hot rolled steel sheet at a cold rolling reduction of 80% or more and less than 90%, thereby manufacturing a cold rolled steel sheet having a sheet thickness of 0.15 to 0.50 mm; carrying out a continuous annealing in which the cold rolled steel sheet is soaked at 810° C. to 850° C. and then cooled; and temper-rolling the cold rolled steel sheet that has been continuously annealed at a rolling reduction of 0.5% to 5.0%.

(6) The method for manufacturing a cold rolled steel sheet for a drawn can according to (5), in which, in manufacturing the hot rolled steel sheet, the cast piece may be heated at 1,100° C. to 1,230° C. and coiled at 600° C. to 670° C., thereby manufacturing the hot rolled steel sheet.

(7) The method for manufacturing a cold rolled steel sheet for a drawn can according to (5) or (6), may further include, after the temper rolling, carrying out any one of the group consisting of a Ni plating treatment, a Sn plating treatment, and a tinfree steel (TFS) plating treatment on at least one surface of the cold rolled steel sheet.

(8) The method for manufacturing a cold rolled steel sheet for a drawn can according to (5) or (6), may further include: carrying out, after manufacturing the cold rolled steel sheet and before carrying out the continuous annealing, a Ni plating treatment in which an adhesion amount of Ni is 9.0 to 27.0 g/m² on at least one surface of the cold rolled steel sheet.

(9) The method for manufacturing a cold rolled steel sheet for a drawn can according to (5) or (6), may further include: carrying out, after manufacturing the cold rolled steel sheet and before carrying out the continuous annealing, a Ni plating treatment in which an adhesion amount of Ni is 9.0 to 22.5 g/m² on at least one surface of the cold rolled steel sheet.

Effects of the Invention

According to the above-described aspect of the present invention, it is possible to provide a fine-grained cold rolled steel sheet for a drawn can which is excellent in terms of press formability (drawability), surface roughening resistance of a can, and earing resistance and has non-ageing property.

Furthermore, in the cold rolled steel sheet for a drawn can according to the above-described aspect of the present invention, in a case where a Ni diffusion plated layer, in which the adhesion amount of Ni onto a base metal steel sheet is large, is formed, it is possible to ensure an appropriate concentration of Fe in the outermost layer of the Ni diffusion plated layer and refine base metal crystal grains.

BRIEF DESCRIPTION OF THE DRAWINGS

FIG. 1 is a view showing a relationship between an amount of C and F1 (=Nb/C), and material characteristics.

EMBODIMENTS OF THE INVENTION

The present inventors carried out investigations and studies regarding press formability, the surface roughening resistance of a can after the can manufacturing, earing resistance, and a non-ageing property and obtained the following knowledge. Here, as described above, a cold rolled steel sheet and a cold rolled plated steel sheet will also be collectively referred to as a cold rolled steel sheet in some cases.

Regarding press formability, it is known that, generally, a more favorable characteristic can be obtained as an average plastic strain ratio $r_m$ (hereinafter, referred to as the average r value in some cases) increases. Interstitial Free (IF) steel represented by Nb-added ultralow carbon steel (Nb-SULC) has a high average r value. However, generally, the crystal grains of IF steel are coarser than those of low carbon steel. When an attempt is made to further increase the average r value in the above-described IF steel, it is necessary to increase the temperature during annealing, and the crystal grains are further coarsened.

Surface roughening occurring on the surface of a cold rolled steel sheet after the can manufacturing can be further suppressed as the crystal grains of the cold rolled steel sheet prior to the can manufacturing are finer. Particularly, in a use for a battery can or the like, it is necessary to ensure a sealing property of an opening sealing portion of an upper lid, and thus a surface quality after drawing which is extremely superior to that in the related art is demanded. In a case where the above-described demand is satisfied, it is necessary to set the crystal grain size number to 11.0 or more (average crystal grain diameter≤7.8 µm).

As described above, the use of IF steel obtains a high average r value. On the other hand, surface roughening resistance further deteriorates as the crystal grains become larger. Therefore, it is difficult to satisfy both press formability and surface roughening resistance using IF steel having large crystal grains. The use of low carbon steel is capable of refining crystal grains, but it is difficult to obtain a high average plastic strain ratio $r_m$. Therefore, even when low carbon steel is used, it is difficult to satisfy both press formability and surface roughening resistance.

The earing resistance becomes more favorable as the absolute value of the in-plane anisotropy (hereinafter, simply referred to as in-plane anisotropy in some cases) $\Delta r$ of the r value decreases. Specifically, as the absolute value of $\Delta r$ decreases, the generation of ears during drawing decreases. When the earing resistance is favorable, the yield of a steel sheet affected by the earing of a drawn can improves, and it is possible to decrease a press flaw or the like attributed to a progressive trouble between steps caused by earing in multiple stages of drawing or DI working or a tear at the front end of earing.

$r_m$ and $\Delta r$ are respectively defined by Expressions (I) and (II) below.

$$r_m = (r0 + 2 \times r45 + r90)/4 \quad (I)$$

$$\Delta r = (r0 + r90 - 2 \times r45)/2 \quad (II)$$

Here, r0 represents the r value in a rolling direction, r90 represents the r value in a rolling orthogonal direction, and r45 represents the r value in a 45° direction from the rolling direction.

In addition, the r value in each direction is obtained using Expression (III) below.

$$r = \ln(w/w0)/\ln(t/t0) \quad (III)$$

Here, t0 represents the sheet thickness before deformation, t represents the sheet thickness after deformation, w0 represents a sheet width before deformation, and w represents the sheet width after deformation.

In order to decrease the absolute value $|\Delta r|$ of the in-plane anisotropy, it is effective to refine crystal grains.

When stretcher strains are generated, protrusions and recesses are generated on the circumferential surface of the can and the can bottom. When a battery can (drawn can) has the above-described protrusion and recess shape, contact electrical resistance increases, which is not preferable, and, also, there is a case where the tensile rigidity of the can degrades and the internal and external pressure-resistant strength of the can also decreases. Therefore, in the cold rolled steel sheet for a drawn can, it is necessary to suppress the generation of stretcher strains during drawing.

Stretcher strains are generated due to the Cottrell effect in a case where an excess solid solution of C is present in steel. Specifically, in a case where an external force is exerted on the cold rolled steel sheet, due to the Cottrell effect attributed to the solid solution of C, dislocations do not move until the force reaches the yield point, and, at the yield point, the dislocations are released from the solid solution of C and migrate at once, whereby yield point elongation (YP-EL) is generated. At this time, stretcher strains are generated. That is, stretcher strains are generated due to yield point elongation (YP-EL: the elongation amount of stationary deformation advancing with a smaller deformation resistance than the yield point immediately after a yield) when the steel sheet deforms. Therefore, when the yield point elongation is zero, the generation of stretcher strains is suppressed for a long period of time.

As a result of studies, the present inventors found that, in order to suppress the generation of stretcher strains while enhancing press formability, surface roughening resistance, and earing resistance, it is important to anneal a steel sheet in which the amount of C is set to 0.0060% to 0.0110% and an amount of Nb is set to an amount satisfying Expression (1) in a predetermined temperature range and to, as the microstructure, form a ferrite single-phase structure in which the crystal grain size number is 11.0 or more.

$$500 \times C \leq Nb/C \leq 8.0 \quad (1)$$

Here, to element symbols in Expression (1), the amounts (% by mass) of the corresponding elements are assigned.

Here, F1 is defined as Nb/C. F1 is an index regarding the amount of the solid solution of C and the refinement of ferrite grains by a Nb carbide.

When F1 is lower than 500×C, the amount of Nb is excessively smaller than the amount of C in steel. In this case, C in the steel is not sufficiently precipitated as NbC, and thus the amount of C remaining as a solid solution in the steel (the amount of the solid solution of C) becomes excessively large. As a result, due to the Cottrell effect of the solid solution of C, the yield point elongation YP-EL is generated, and stretcher strains are generated.

On the other hand, when F1 is higher than 8.0, the amount of Nb is excessively larger than the amount of C. In this case, NbC coarsens, and the pinning effect degrades. Therefore, ferrite grains coarsen, and the crystal grain size number becomes less than 11.0. In this case, surface roughening is likely to occur.

In a case where F1 satisfies Expression (1), an appropriate amount of a Nb carbide is generated, ferrite grains are refined, and the crystal grain size number becomes 11.0 or more. Therefore, surface roughening resistance enhances. Furthermore, the amount of the solid solution of C is decreased, and thus no stretcher strains are generated. Furthermore, ferrite grains are refined, and the absolute value $|\Delta r|$ of the in-plane anisotropy is suppressed on a low level.

FIG. 1 is a view showing the relationship between the amount of C and F1 (=Nb/C), and material characteristics. FIG. 1 is a view showing the relationship between the amount of C and F1, and material characteristics in an organized manner regarding examples in which the amount of C, components other than Nb/C, and manufacturing conditions were in the scope of the present invention among examples described below in detail. Regarding the material characteristics, a cold rolled steel sheet for a drawn can in which the crystal grain size number was 11.0 or more, in an L direction (extension direction) of the cold rolled steel sheet for a drawn can that had been aged at 100° C. for one hour, the yield strength YP was 220 to 290 MPa, the tensile strength TS was 330 to 390 MPa, the total elongation EL was 32% or more, the yield point elongation YP-EL was 0%, the average plastic strain ratio $r_m$ was more than 1.35, and the in-plane anisotropy $\Delta r$ was −0.30 to +0.15 was regarded as pass, and a cold rolled steel sheet for a drawn can which failed to satisfy any of the above-described material characteristics was regarded as fail.

The reason for evaluating the yield strength YP, tensile strength TS, total elongation EL, yield point elongation YP-EL, average plastic strain ratio $r_m$, and in-plane anisotropy $\Delta r$ of the cold rolled steel sheet for a drawn can which had been aged at 100° C. for one hour (hereinafter, referred to as "progressive ageing treatment") is as described below.

The cold rolled steel sheet has predetermined characteristics regarding all of the above-described material characteristics immediately after being manufactured, but is aged at a normal temperature over time, which changes the characteristics. Generally, ageing increases the strength, decreases the elongation, and makes the generation of the yield point elongation easier. Therefore, when the time elapses from the manufacturing, there is a case where predetermined characteristics cannot be obtained at the time of actually manufacturing a drawn can. The ageing treatment at 100° C. for one hour is an accelerating test that accelerates the normal temperature ageing, and thus, when predetermined characteristics are obtained after the ageing treatment at 100° C. for one hour, it means that the cold rolled steel sheet for a drawn can has the predetermined characteristics even after a long period of time elapses at a normal temperature.

Even in a case where the progressive ageing is not carried out, for example, when the cold rolled steel sheet for a drawn can is stored at a normal temperature for six months or longer after the manufacturing, ageing is considered to be completed.

From FIG. 1, it is found that, when the amount of C, the components other than F1 (=Nb/C), and the manufacturing conditions are limited to the scope of the present invention, then, the amount of C is set to 0.0060% to 0.0110%, and F1 satisfies Expression (1), necessary material characteristics can be obtained even after progressive ageing.

The cold rolled steel sheet for a drawn can of the present invention completed on the basis of the above-described finding has a chemical composition containing, by mass %, C: 0.0060% to 0.0110%, Si: 0.50% or less, Mn: 0.70% or less, P: 0.070% or less, S: 0.050% or less, Sol. Al: 0.005% to 0.100%, N: less than 0.0025%, Nb satisfying Expression (1), and B: 0% to 0.0030%, with a remainder of Fe and an impurity and a ferrite single-phase structure with a crystal grain size number of 11.0 or more, the sheet thickness is 0.15 to 0.50 mm, in the L direction of the cold rolled steel sheet for a drawn can after the ageing treatment at 100° C. for one hour, the yield strength YP is 220 to 290 MPa, the tensile strength TS is 330 to 390 MPa, the total elongation EL is 32% or more, the yield point elongation YP-EL is 0%, the average plastic strain ratio $r_m$ is more than 1.35, and the in-plane anisotropy $\Delta r$ is −0.30 to +0.15. The crystal grain size number was 12.0 or less in the experiments, but is preferably 13.0 or less in consideration of the economic efficiency. Here, the grain size number is advantageously large from the viewpoint of surface roughening resistance, and thus the upper limit thereof is not limited.

$$500 \times C \leq Nb/C \leq 8.0 \tag{1}$$

Here, to element symbols in Expression (1), the amounts (% by mass) of the corresponding elements are assigned.

The cold rolled steel sheet for a drawn can may be a cold rolled steel sheet including any one of the group consisting of a Ni-plated layer, a Ni diffusion plated layer, a Sn-plated layer, and a tinfree steel (TFS)-plated layer on the surface.

A method for manufacturing a steel sheet for a drawn can of the present invention includes a step of heating a cast piece having the above-described chemical composition to 1,000° C. or higher, carrying out finish rolling at 870° C. to 960° C., cooling the finish-rolled cast piece after finish rolling, and coiling the finish-rolled cast piece at 450° C. or higher and lower than 700° C., thereby manufacturing a hot rolled steel sheet, a step of carrying out cold rolling on the hot rolled steel sheet at a cold rolling reduction of 80% or more and less than 90%, thereby manufacturing a cold rolled steel sheet having a sheet thickness of 0.15 to 0.50 mm, a step of carrying out continuous annealing in which the cold rolled steel sheet is soaked at 810° C. to 850° C. and cooled, and a step of temper-rolling the cold rolled steel sheet that has been continuously annealed at a rolling reduction of 0.5% to 5.0%.

In the step of manufacturing the hot rolled steel sheet, the cast piece may be heated at 1,100° C. to 1,230° C. and coiled at 600° C. to 670° C., thereby manufacturing the hot rolled steel sheet.

In the manufacturing method, after the temper rolling is carried out, furthermore, any one of the group consisting of a Ni plating treatment, a Sn plating treatment, and a tinfree steel (TFS) plating treatment may be carried out on at least one surface of the cold rolled steel sheet.

In the manufacturing method, in the step of manufacturing the cold rolled steel sheet, a Ni plating treatment may be carried out on at least one surface of the cold rolled steel sheet before the step of carrying out the continuous annealing. The adhesion amount of Ni may be 9.0 to 27.0 g/m$^2$ or 9.0 to 22.5 g/m$^2$.

The Ni—Fe alloying of the Ni plating and the annealing of the steel sheet can be carried out at the same time by carrying out Ni plating after the cold rolling and before the continuous annealing, which is reasonable from the viewpoint of heat economy. In this case, temper rolling is carried out after the Ni-plated steel sheet is annealed.

Hereinafter, a cold rolled steel sheet for a drawn can according to an embodiment of the present invention (the cold rolled steel sheet for a drawn can according to the present embodiment) will be described in detail.

[Chemical Composition]

The chemical composition of the cold rolled steel sheet for a drawn can according to the present embodiment contains the following elements. A sign "%" regarding amounts described below indicates "% by mass" unless particularly otherwise described.

C: 0.0060% to 0.0110%

Carbon (C) is an element that is solid soluted in steel and increase the strength and, in a case where an appropriate amount of Nb described below is contained, forms a fine carbide to refine crystal grains. When the amount of C is 0.0060% or more, with an assumption that other chemical compositions and manufacturing conditions described below are satisfied, in the L direction after the progressive ageing treatment, the yield strength YP becomes 220 MPa or more, and the tensile strength TS becomes 330 MPa or more. When the amount of C is less than 0.0060%, this effect cannot be obtained. Therefore, the amount of C is set to 0.0060% or more. A preferred lower limit of the amount of C is 0.0065% and more preferably 0.0070%.

On the other hand, when the amount of C exceeds 0.0110%, the hardness of the cold rolled steel sheet becomes excessively high. In this case, the total elongation EL in the L direction after the progressive ageing treatment decreases, and the press formability degrades. Therefore, the amount of C is 0.0110% or less. A preferred upper limit of the amount of C is 0.0105%.

Si: 0.50% or less

Silicon (Si) is, in the cold rolled steel sheet for a drawn can according to the present embodiment, an inevitably-contained impurity. Si degrades the plating adhesion of the cold rolled steel sheet and the paint adhesion of the cold rolled steel sheet after the can manufacturing. Therefore, the amount of Si is 0.50% or less. A preferred upper limit of the amount of Si is less than 0.50%. The amount of Si is preferably as small as possible.

Mn: 0.70% or less

Mn hardens the cold rolled steel sheet and decreases the total elongation EL of the cold rolled steel sheet. Therefore, when the amount of Mn becomes excessive, the press formability degrades. Therefore, the amount of Mn is 0.70% or less. A preferred upper limit of the amount of Mn is 0.50%, more preferably 0.35%, and still more preferably 0.22%.

Manganese (Mn) has an effect for preventing hot embrittlement attributed to the presence of S. In the case of obtaining this effect, the amount of Mn is preferably set to 0.02% or more and more preferably set to 0.05% or more.

P: 0.070% or less

Phosphorus (P) is an inevitably-contained impurity. P is an element that increases the strength of the cold rolled steel sheet; however, when the amount of P is excessively large, the press formability degrades. Specifically, anti-second working embrittlement cracking property in a can degrades. In a drawn can, there is a case where an end portion of a can side wall fractures in a brittle manner due to an impact during drop or a bending strain at, for example, a low temperature such as −10° C. The above-described easiness in fracture is referred to as the second working embrittlement cracking property. Therefore, the amount of P is 0.070% or less. The amount of P may be 0%.

S: 0.050% or less

Sulfur (S) is an inevitably-contained impurity. S causes surface layer brittle cracking in the steel sheet under hot rolling and causes ear roughening in a hot rolled steel strip. Therefore, the amount of S is 0.050% or less. The amount of S is preferably as small as possible and may be 0%.

Sol. Al: 0.005% to 0.100%

Aluminum (Al) is an effective element for the deoxidation of steel. When the amount of Al is less than 0.005%, the above-described effect cannot be obtained. Therefore, the amount of Al is set to 0.005% or more.

On the other hand, when the amount of Al exceeds 0.100%, the above-described effect is saturated, and the manufacturing cost increases. Therefore, the amount of Al is 0.100% or less. In the present embodiment, the amount of Al is the amount of acid-soluble Al (Sol. Al).

N: less than 0.0025%

Nitrogen (N) is an inevitably-contained impurity. When the amount of N is 0.0025% or more, it becomes easy for the ear cracking of a slab to occur. Therefore, the amount of N is set to less than 0.0025%. The amount of N may be 0%.

Nb: Amount satisfying Expression (1)

$$500 \times C \leq Nb/C \leq 8.0 \quad (1)$$

Here, to element symbols in Expression (1), the amounts (% by mass) of the corresponding elements are assigned. In addition, F1 is defined as Nb/C.

Nb is an element that bonds to C and forms a fine carbide, thereby suppressing the amount of the solid solution of C. This fine carbide contributes to the refinement of crystal grains. F1 is an index regarding the refinement of ferrite grains by a Nb carbide. When F1 is lower than 500×C, the amount of Nb is excessively smaller than the amount of C in steel. In this case, C is not precipitated as NbC, and thus the amount of C remaining as a solid solution in the steel (the amount of the solid solution of C) becomes large. Therefore, due to the Cottrell effect of the solid solution of C, the yield point elongation YP-EL is generated.

On the other hand, when F1 is higher than 8.0, the amount of Nb is excessively larger than the amount of C. In this case, NbC coarsens, and the pinning effect degrades. Therefore, ferrite grains coarsen, and the crystal grain size number becomes less than 11.0. In this case, surface roughening is likely to occur.

When F1 is 500×C to 8.0, the amount of Nb with respect to the amount of C in the steel is appropriate. In this case, fine NbC is sufficiently precipitated. Due to the pinning effect of this fine NbC, ferrite grains are refined, and the crystal grain size number becomes 11.0 or more. Furthermore, the amount of the solid solution of C is suppressed, and thus the yield point elongation YP-EL is not generated (YP-EL becomes 0%) even after ageing. Therefore, stretcher strains are not generated.

The remainder of the chemical composition of the cold rolled steel sheet for a drawn can according to the present embodiment is Fe and an impurity. In the present embodiment, the impurity refers to an element that is mixed in from a mineral or a scrap as a raw material or from a manufacturing environment or the like during the industrial manufacturing of a steel material. The impurity is, for example, Cu, Ni, Cr. and Sn. Preferred amounts of these elements are 0.5% or less for Cu, 0.5% or less for Ni, 0.3% or less for Cr, and 0.05% or less for Sn.

The chemical composition of the cold rolled steel sheet for a drawn can according to the present embodiment basically includes the above-described elements with the remainder of Fe and the impurity, but may contain B and Ti instead of some of Fe.

B: 0% to 0.0030%

Boron (B) refines recrystallized grains during annealing. In the case of obtaining this effect, the amount of B is preferably set to 0.0001% or more. The amount of B is more preferably 0.0003% or more.

On the other hand, when the amount of B exceeds 0.0030%, the optimal cold-rolling reduction for refinement decreases, and the productivity degrades. Therefore, even in a case where B is contained, the amount of B is 0.0030% or less. A preferred upper limit of the amount of B is 0.0020%. B is an arbitrary additive element and may not be contained.

Ti: 0% to 0.035%

Ti is an element that forms a fine carbonitride and is effective for suppressing the coarsening of crystal grains. In the case of obtaining this effect, the amount of Ti is preferably set to 0.005% or more. The amount of Ti is more preferably 0.010% or more.

When the amount of Ti exceeds 0.035%, TiN coarsens, and there is a case where toughness deteriorates. Therefore, even in a case where Ti is contained, the amount of T is 0.035% or less. A preferred upper limit of the amount of Ti is 0.025%. Ti is an arbitrary additive element and may not be contained.

[Microstructure and Crystal Grain Size Number]

The microstructure of the cold rolled steel sheet for a drawn can according to the present embodiment includes ferrite and a precipitate. That is, the matrix (primary phase) of the microstructure is a ferrite single phase. The matrix is a ferrite single phase, and thus uniform deformation is possible, and the total elongation EL can be set to 32% or more. As a result, excellent press formability can be obtained.

Furthermore, when the crystal grains are coarse, surface roughening is likely to occur. Therefore, in the microstructure of the cold rolled steel sheet for a drawn can according to the present embodiment, the crystal grain size number is 11.0 or more. The crystal grain size number is preferably 11.2 or more.

The crystal grain size number of the ferrite grain refers to a crystal grain size number according to JIS G 0551 (2013). Specifically, the grain size number is measured by observing an L-section (a section parallel to a rolling direction and a sheet thickness direction) of the cold rolled steel sheet by an optical microscope, according to a comparison method (refer to 7.2 of JIS G 0551 (2013)).

[Mechanical Characteristics]

The yield strength YP, the tensile strength TS, the total elongation EL, the yield point elongation YP-EL, the average plastic strain ratio $r_m$ value, and the in-plane anisotropy $\Delta r$ in the L direction (rolling direction); after the ageing treatment at 100° C. for one hour (referred to as the progressive ageing treatment) are as described below.

YP: 220 to 290 MPa,

TS: 330 to 390 MPa,

El≥32%

YP-El=0

Average plastic strain ratio rm>1.35

In-plane anisotropy $\Delta r$: −0.30 to +0.15

When YS or TS is below the lower limit, a necessary strength cannot be obtained. When YS exceeds the upper limit, the forming load increases, and forming becomes difficult. When TS exceeds the upper limit, the formability deteriorates, and a risk causing secondary working embrittlement increases.

When the total elongation El or the average plastic strain ratio $r_m$ becomes excessively small, the formability degrades. The average plastic strain ratio rm is preferably 1.40 or more.

The upper limit of the average plastic strain ratio may not be limited; however, in the cold rolled steel sheet for a drawn can according to the present embodiment, BAF-OA is not carried out, and thus the average plastic strain ratio $r_m$ becomes substantially 2.1 or less.

When YP-El exceeds 0, stretcher strains are generated.

When the absolute value |$\Delta r$| of the in-plane anisotropy increases, the earing resistance degrades. When the in-plane anisotropy $\Delta r$ is −0.30 to +0.15, the earing resistance is also excellent.

The yield strength YP, the tensile strength TS, the total elongation EL, and the yield point elongation YP-EL in the L direction are obtained using the following methods.

A JIS No. 5 tensile test piece (according to the regulation of JIS Z 2201) having a parallel portion parallel to the L direction (rolling direction), which is collected from the cold rolled steel sheet for a drawn can, is produced. An ageing treatment (progressive ageing treatment) is carried out on the produced test piece at 100° C. for one hour. A tensile test is carried out according to JIS Z 2241 (2011) on the tensile test piece after the progressive ageing treatment at room temperature (25° C.) in the atmosphere, thereby obtaining the yield strength YP (MPa), the tensile strength TS (MPa), and the total elongation EL (%).

The average plastic strain ratio $r_m$ and the in-plane anisotropy $\Delta r$ are obtained using the following methods.

JIS No. 13 B tensile test pieces (according to the regulation of JIS Z 2201) parallel to individual directions of being parallel, 45°, and 90° with respect to the rolling direction are produced from the cold rolled steel sheet for a drawn can. An ageing treatment (progressive ageing treatment) is carried out on the produced test pieces at 100° C. for one hour. A plastic strain ratio test is carried out according to JIS Z 2254 (2008) on the tensile test pieces after the progressive ageing treatment, and the average plastic strain ratio $r_m$ and the in-plane anisotropy $\Delta r$ with a plastic strain amount being 15% are obtained.

[Plated Layer]

The cold rolled steel sheet for a drawn can according to the present embodiment may include a plated layer on the surface. The plated layer is not necessarily limited, and, for example, platings such as a Ni plating, a Ni diffusion plating, a Sn plating, and a tinfree steel (TFS) plating are exemplary examples.

Among the above-described surface treatments, Ni diffusion plating is particularly preferred since Ni diffusion plating is capable of enhancing the adhesion of the plated layer by thermally treating a Ni-plated steel sheet to turn a part of the plated layer into a Ni—Fe alloy layer.

In addition, Ni diffusion plating is also capable of turning at least a part of a Ni-plated layer into a highly economic Ni—Fe alloy layer in an annealing step of the drawn steel sheet for a can by carrying out Ni plating before annealing. In the cold rolled steel sheet for a drawn can according to the present embodiment, it is not easy to coarsen the crystal grains by high-temperature annealing, and thus by carrying out Ni plating on a steel sheet that has been cold-rolled but yet to be annealed so as to provide a plating with a relatively large plating thickness, and the steel sheet is annealed at a high temperature, it is possible to provide a Ni diffusion plated steel sheet having a plating thickness in which Fe diffuses up to the surface of the plated layer. The Ni diffusion plated steel sheet having a plating thickness in which Fe diffuses up to the surface of the plated layer is excellent in terms of sliding ability with a die. In addition, when Fe is diffused up to the surface layer, the occurrence of seizure on die during pressing is decreased, and thus defects does not easily occur, and an effect for improving corrosion resistance, the suppression of a decrease in the electrical conduction property on the can inner surface of an alkali battery, and the improvement of electrolytic solution resistance on the inner surface of a lithium ion battery are also expected.

In the case of carrying out the Ni plating treatment, a preferred thickness of the Ni-plated layer that is formed on the surface of the cold rolled steel sheet is 0.51 to 5.1 μm (4.5 to 45.0 g/m$^2$ in terms of the adhesion amount of Ni). In the case of carrying out a Ni diffusion plating treatment, a preferred thickness of the Ni-plated layer that is formed on the surface of the cold rolled steel sheet is 1.0 to 3.0 μm (9.0 to 27.0 g/m$^2$ in terms of the adhesion amount of Ni), more preferably 1.0 to 2.5 μm (9.0 to 22.5 g/m$^2$ in terms of the adhesion amount of Ni), and still more preferably 1.2 to 2.0 μm (10.8 to 18.0 g/m$^2$ in terms of the adhesion amount of Ni). When the thickness of the Ni plating is excessively thin, corrosion resistance deteriorates. On the other hand, when the thickness of the Ni plating is excessively thick, it is not possible to diffuse Fe up to the outer surface layer of the Ni-plated layer even when the cold rolled steel sheet is continuously annealed, and Ni that does not form an alloy with Fe remains in the surface layer portion of the plating, and thus the cold rolled steel sheet is likely to cling to the die during pressing, and there is a case where the press formability degrades.

The adhesion amount of the plating can be measured using a fluorescent X-ray analysis instrument.

In the case of forming a Ni diffusion plating in which Fe diffuses up to the surface of a plated layer as the plated layer, the concentration of Fe in the surface layer of a Ni diffusion plated layer is desirably 3% by mass or more. When the concentration of Fe is less than 3% by mass, the steel sheet is likely to cling to the die during pressing, and the press formability does not improve. The concentration of Fe in the surface layer is preferably 10% by mass or more and more preferably 15% by mass or more. From the viewpoint of corrosion resistance, the concentration of Fe in the surface layer is 80% by mass or less, preferably 70% by mass or less, and more preferably 60% by mass or less. The concentration of Fe in the surface layer of the Ni diffusion plated layer can be analyzed using an X-ray photoelectron spectrometer (XPS).

Here, the surface layer that regulates the concentration of Fe refers to a location at a depth (several nanometers from the surface) at which information can be obtained using XPS. That is, when the concentration of Fe is found out to be 3% by mass or more and 80% by mass or less by measurement using XPS, it can be determined that Fe is preferably diffused up to the surface of the plated layer.

[Sheet Thickness]

The sheet thickness of the cold rolled steel sheet for a drawn can according to the present embodiment is 0.15 to 0.50 mm. When the sheet thickness exceeds 0.50 mm, it becomes difficult to obtain excellent press formability. On the other hand, when the sheet thickness is less than 0.15 mm, the sheet thickness of the hot rolled steel sheet needs to be thin, and, in this case, a finish temperature during hot rolling described below cannot be ensured. Therefore, the sheet thickness of the cold rolled steel sheet is 0.15 to 0.50 mm.

[Manufacturing Method]

An example of a method for manufacturing a cold rolled steel sheet for a drawn can according to the present embodiment will be described.

The method for manufacturing a cold rolled steel sheet for a drawn can according to the present embodiment includes a step of manufacturing a cast piece (steel making step), a step of manufacturing a hot rolled steel sheet (hot rolling step), a step of manufacturing a cold rolled steel sheet (cold rolling step), a step of carrying out continuous annealing (CAL) on the cold rolled steel sheet (continuous annealing (CAL) step), and a step of carrying out temper rolling on the cold rolled steel sheet after CAL. Hereinafter, the respective steps will be described in detail.

[Steel Making Step]

First, molten steel having the above-described chemical composition is manufactured. A cast piece (slab) is manufactured from the manufactured molten steel using a continuous casting method. A method for manufacturing the slab is not particularly limited.

[Hot Rolling Step]

The slab heated to a heating temperature of 1,000° C. or higher is hot-rolled, thereby manufacturing a hot rolled steel sheet. More specifically, the heating temperature of the slab is, for example, 1,000° C. to 1,280° C. When the heating temperature of the slab is higher than 1,280° C., ear cracks is likely to generate during hot rolling. In addition, the average plastic strain ratio $r_m$ decreases. On the other hand, when the heating temperature of the slab is lower than 1,000° C., it becomes difficult to ensure an appropriate rolling finish temperature FT. A preferred heating temperature of the slab is 1,100° C. to 1,230° C.

In the hot rolling, finish rolling is completed at a rolling finish temperature FT of 870° C. to 960° C. When FT is higher than 960° C., the average plastic strain ratio $r_m$ decreases. On the other hand, when FT is lower than 870° C., the absolute value $|\Delta r|$ of the in-plane anisotropy increases.

The hot rolled steel sheet after the finish rolling is cooled in a cooling zone and then coiled around a coil. A coiling temperature CT is, for example, 450° C. or higher and lower than 700° C. When CT is higher than 700° C., the crystal grains become coarse after rolling and annealing, and the surface roughening resistance degrades. On the other hand, when CT becomes lower than 450° C., the average plastic strain ratio $r_m$ decreases, and the absolute value $|\Delta r|$ of the in-plane anisotropy increases. A preferred coiling temperature CT is 600° C. to 670° C.

[Cold Rolling Step]

The hot rolled steel sheet is cold-rolled, thereby manufacturing a cold rolled steel sheet. In a case where the cold rolling reduction is less than 80% or more than 90%, the in-plane anisotropy of the steel sheet increases. Therefore, the cold rolling reduction is set to 80% or more and less than 90%. It is preferable to study the optimal cold rolling reduction of the cold rolled steel sheet for a drawn can in advance by changing the cold rolling reduction and set the cold rolling reduction so that the absolute value $|\Delta r|$ of the in-plane anisotropy of the steel sheet decreases.

[Continuous Annealing (CAL) Step]

Continuous annealing is carried out on the cold rolled steel sheet. A continuous annealing line is referred to as "Continuous Annealing Line", and thus, in the present embodiment, continuous annealing will be referred to as "CAL". An annealing temperature ST (soaking temperature) in CAL is 810° C. to 850° C. When the annealing temperature ST is lower than 810° C., recrystallization is not completed in steel and a non-recrystallized structure remains. In this case, desired mechanical characteristics cannot be obtained.

On the other hand, when the annealing temperature ST is higher than 850° C. recrystallized grains coarsen, and the crystal grain size number decreases. Therefore, the annealing temperature ST is 810° C. to 850° C. A preferred lower limit of the annealing temperature ST is 820° C. A preferred upper limit of the annealing temperature ST is 830° C. The soaking time at the annealing temperature ST is, for example, 10 to 60 seconds.

[Regarding BAF-OA]

In the present embodiment, after CAL, over aging in a box annealing furnace (the box annealing furnace refers to "Box Annealing Furnace", over aging refers to "Over Aging", and, hereinafter, over aging in a box annealing furnace will be referred to as BAF-OA) is not carried out. This is because, in the cold rolled steel sheet for a drawn can according to the present embodiment, the yield point elongation YP-EL after the progressive ageing treatment is 0%, and stretcher strains are not generated. In the method for manufacturing a cold rolled steel sheet for a drawn can according to the present embodiment, BAF-OA is not carried out after CAL, and thus the productivity enhances.

[Temper Rolling Step]

Temper rolling (skin pass rolling) is carried out on the cold rolled steel sheet after CAL. The rolling reduction in the temper rolling is 0.5% to 5.0%. When the rolling reduction is less than 0.5%, there is a case where the yield point elongation YP-EL is generated in the cold rolled steel sheet after the progressive ageing treatment. When the rolling reduction exceeds 5.0%, the total elongation EL becomes less than 32%, and the press formability degrades. When the rolling reduction is 0.5% to 5.0%, stretcher strains are not generated, and excellent press formability is also obtained.

The cold rolled steel sheet for a drawn can according to the present embodiment is manufactured with the above-described manufacturing steps.

[Plating Treatment]

A surface treatment such as plating may be carried out on the above-described cold rolled steel sheet for a drawn can. The surface treatment is not necessarily limited, and, for example, plating treatments such as a Ni plating treatment, a Ni diffusion plating treatment, a Sn plating treatment, and a tinfree steel (TFS) plating treatment are exemplary examples. The Ni plating treatment the Sn plating treatment, and the TFS plating treatment are carried out on, for example, the cold rolled steel sheet after the temper rolling step.

In the case of carrying out the Ni plating treatment, a preferred thickness of a Ni-plated layer that is formed on the surface of the cold rolled steel sheet is 0.51 to 5.1 μm (4.5 to 45.0 g/m$^2$ in terms of the adhesion amount of Ni).

In the case of forming a Ni diffusion plating by carrying out a thermal treatment after Ni plating, the Ni plating treatment is preferably carried out after the cold rolling step and before the CAL step. In this case, CAL is carried out on the cold rolled steel sheet on which the Ni-plated layer is formed. During CAL, Ni in the Ni-plated layer diffuses, and a Ni diffusion plated layer is formed.

In the case of carrying out the Ni diffusion plating treatment, a preferred thickness of a Ni-plated layer that is formed on the surface of the cold rolled steel sheet before the CAL step is 1.0 to 3.0 μm (9.0 to 27.0 g/m$^2$ in terms of the adhesion amount of Ni), more preferably 1.0 to 2.5 μm (9.0 to 22.5 g/m$^2$ in terms of the adhesion amount of Ni), and still more preferably 1.2 to 2.0 μm (10.8 to 18.0 g/m$^2$ in terms of the adhesion amount of Ni). When the thickness of the Ni plating is excessively thin, the corrosion resistance deteriorates. When the thickness of the Ni plating is excessively thick, it is not possible to diffuse Fe up to the outer surface layer of the Ni-plated layer even when the cold rolled steel sheet is continuously annealed under the above-described conditions, and Ni that does not form an alloy with Fe remains in the surface layer portion of the plating, and thus the cold rolled steel sheet is likely to cling to the die during pressing, and the press formability deteriorates.

In the manufacturing of a Ni diffusion plated steel sheet (particularly, a steel strip), it is reasonable to pretreat (defat, pickle, or the like) a full-hard cold rolled steel sheet in advance before the continuous annealing step of the cold rolled steel sheet, then, carry out Ni plating by, for example, Ni electro plating, and then carry out continuous annealing since it is possible to carry out the recrystallization of a base steel sheet and the alloying of Ni and Fe at the same time in the continuous annealing step.

EXAMPLES

Cold rolled steel sheets having a variety of chemical compositions were manufactured under a variety of manufacturing conditions, and mechanical characteristics and r values were investigated.

[Method for Manufacturing Materials to be Tested]

Slabs of steels A to Z having a chemical composition shown in Table 1 were manufactured.

The slabs with individual test numbers were hot-rolled under hot rolling conditions (a heating temperature of the slab (° C.), a finish rolling temperature FT (° C.), and a coiling temperature CT (° C.)) shown in Table 2-1 and Table 2-2, thereby manufacturing hot rolled steel sheets.

The hot rolled steel sheets were pickled and then cold-rolled under a cold rolling condition (cold rolling reduction) shown in Table 2-1 and Table 2-2, thereby manufacturing cold rolled steel sheets having a sheet thickness of 0.25 mm or 0.55 mm.

A test level in which a Ni diffusion plated layer was formed on each of the cold rolled steel sheets shown in Table 2-1 and Table 2-2 was also additionally carried out. Specifically, before CAL, electro plating was carried out on front and rear surfaces of the cold rolled steel sheet under conditions shown in Table 3, thereby forming a plating. The plating adhesion amount was adjusted by changing the plating time.

Continuous annealing (CAL) was carried out on the obtained cold rolled steel sheets of Table 2-1 and Table 2-2 and the Ni-plated cold rolled steel sheets of Table 4-1 and Table 4-2. Annealing temperatures ST (° C.) were as shown in Table 2-1, Table 2-2, Table 4-1, and Table 4-2. Here, Table 2-1 and Table 2-2 show the cold rolled steel sheets, and Table 4-1 and Table 4-2 show Ni diffusion plated cold rolled steel sheets (the Ni plated steel sheets were continuously annealed, thereby obtaining Ni diffusion plated cold rolled steel sheets). Regarding test numbers of the Ni diffusion plated cold rolled steel sheets of Table 4-1 and Table 4-2, B, B2, and B3 were added to the back of the test numbers of the cold rolled steel sheets for which components and manufacturing steps through the cold rolling were common.

In CAL, the cold rolled steel sheets and the Ni diffusion plated cold rolled steel sheets with the respective test numbers were soaked at the annealing temperature ST (° C.) for 25 seconds. After that, gas cooling was carried out using a nitrogen gas. In the gas cooling, the average cooling rate from the annealing temperature ST (° C.) to 50° C. or lower were set to 25° C./second for all of the cold rolled steel sheets.

On the cold rolled steel sheet with Test Number 11 and the Ni diffusion plated cold rolled steel sheet with Test Number 11B, BAF-OA was further carried out after CAL. In BAF-OA, the cold rolled steel sheets and the Ni diffusion plated cold rolled steel sheet were soaked at 450° C. for five hours and then slowly cooled for 72 hours. On the cold rolled steel sheets and the Ni diffusion plated cold rolled steel sheets with the other test numbers, BAF-OA was not carried out. In the column "annealing method" of Table 2-1, Table 2-2, Table 4-1, and Table 4-2, "CAL+BAF-OA" indicates that BAF-OA was carried out after CAL. "CAL" indicates that CAL was carried out and BAF-OA was not carried out.

On the cold rolled steel sheets and the Ni diffusion plated cold rolled steel sheets after the annealing, temper rolling was carried out. The rolling reductions in the temper rolling were 1.8% or 0.3%. With the above-described manufacturing steps, the cold rolled steel sheets and the Ni diffusion plated cold rolled steel sheets, which served as materials to be tested were manufactured.

For the cold rolled steel sheets and the Ni diffusion plated cold rolled steel sheets manufactured as described above, a microstructure, mechanical characteristics, an average plastic strain ratio $r_m$, an in-plane anisotropy $\Delta r$, the adhesion amounts of Ni in the Ni-plating on the front surface and the rear surface, and the concentration of Fe in a surface layer of the plated layer were measured.

[Observation of Microstructure and Measurement of Crystal Grain Size Number]

L-sections (sections parallel to a rolling direction and a sheet thickness direction) of the cold rolled steel sheets and the Ni diffusion plated cold rolled steel sheets after the temper rolling were observed using an optical microscope, and microstructures of the cold rolled steel sheets and the Ni diffusion plated cold rolled steel sheets were specified. Specified results are shown in Table 2-1, Table 2-2, Table 4-1, and Table 4-2. The microstructures were a ferrite single-phase structure in all of the cold rolled steel sheets.

Furthermore, the crystal grain size numbers of ferrite grains in the cold rolled steel sheets with the respective test numbers were obtained using the above-described method according to JIS G 0551 (2013). The obtained results are shown in Table 2-1, Table 2-2, Table 4-1, and Table 4-2.

When the structure was a ferrite single-phase structure and the crystal grain size number was 11.0 or more, the surface roughening resistance was determined to be excellent.

[Test for Evaluating Mechanical Characteristics]

JIS No. 5 tensile test pieces were produced from the cold rolled steel sheets and the Ni diffusion plated cold rolled steel sheets with the respective test numbers. Parallel portions of the tensile test pieces were parallel to the L direction (rolling direction) of the cold rolled steel sheets and the Ni diffusion plated cold rolled steel sheets. A progressive ageing treatment was carried out on the produced tensile test pieces. Specifically, an ageing treatment was carried out on the respective tensile test pieces at 100° C. for one hour.

A tensile test was carried out according to JIS Z 2241 (2011) on the tensile test pieces after the progressive ageing treatment at room temperature (25° C.) in the atmosphere, thereby obtaining yield strengths YP (MPa), tensile strengths TS (MPa), total elongations EL (%), and yield point elongations YP-EL (%). The obtained results are shown in Table 2-1, Table 2-2, Table 4-1, and Table 4-2.

[Test for Measuring $r_m$ Values and $\Delta r$ Values]

JIS No. 13 B tensile test pieces (according to the regulation of JIS Z 2201) parallel to individual directions of being parallel, 45°, and 90° with respect to the rolling direction were produced from the cold rolled steel sheets and the Ni diffusion plated cold rolled steel sheets with the respective test numbers. An ageing treatment (progressive ageing treatment) was carried out on the produced test pieces at 100° C. for one hour, a plastic strain ratio test was carried out according to JIS Z 2254 (2008) on the tensile test pieces after the progressive ageing treatment, and the average plastic strain ratio $r_m$ and the in-plane anisotropy $\Delta r$ with a plastic strain amount being 15% were obtained. The obtained results are shown in Table 2-1, Table 2-2, Table 4-1, and Table 4-2.

When $r_m$ exceeded 1.35, the press formability was determined to be excellent. In addition, when $\Delta r$ was −0.30 to +0.15, the earing resistance was determined to be excellent.

[Adhesion Amount of Plating and Concentration of Fe in Surface Layer of Plated Layer]

On the Ni diffusion plated cold rolled steel sheets, in addition to the above-described tests, the concentrations of Fe in the surface layers of the Ni diffusion plated layers were measured using an X-ray photoelectron spectrometer (XPS). In an analysis using XPS, PHI5600 manufactured by ULVAC-PHI, Incorporated was used. As an X-ray source, MgKα was used. The surface layer was spattered with Ar ions 4 nm in terms of $SiO_2$, and then the composition was analyzed. In the composition, the total of Ni and Fe was set to 100%. An X-ray beam diameter was set to 800 μm.

In addition, the adhesion amount of the plating was measured using a fluorescent X-ray analyzer.

The measurement results are shown in Table 4-1 and Table 4-2.

TABLE 1

| Steel No. | \multicolumn{10}{c}{Chemical composition (% by mass)} | | | Range of Nb/C in the present invention | | Note |
| --- | --- | --- | --- | --- | --- | --- | --- | --- | --- | --- | --- | --- | --- | --- |
| | C | Si | Mn | P | S | Sol. Al | N | Nb | B | Ti | Nb/C | Lower limit | Upper limit | |
| A | 0.0070 | 0.01 | 0.14 | 0.011 | 0.011 | 0.039 | 0.0020 | 0.034 | 0.0000 | 0.000 | 4.9 | 3.5 | 8.0 | Inventive Example |
| B | 0.0071 | 0.02 | 0.15 | 0.009 | 0.009 | 0.040 | 0.0016 | 0.052 | 0.0000 | 0.000 | 7.3 | 3.6 | 8.0 | |
| C | 0.0078 | 0.01 | 0.15 | 0.013 | 0.011 | 0.039 | 0.0020 | 0.034 | 0.0000 | 0.000 | 4.4 | 3.9 | 8.0 | |
| D | 0.0078 | 0.03 | 0.16 | 0.010 | 0.013 | 0.039 | 0.0020 | 0.044 | 0.0000 | 0.000 | 5.6 | 3.9 | 8.0 | |
| E | 0.0098 | 0.01 | 0.15 | 0.007 | 0.010 | 0.043 | 0.0023 | 0.050 | 0.0000 | 0.000 | 5.1 | 4.9 | 8.0 | |
| F | 0.0094 | 0.02 | 0.14 | 0.010 | 0.007 | 0.043 | 0.0021 | 0.066 | 0.0005 | 0.000 | 7.0 | 4.7 | 8.0 | |
| G | 0.0108 | 0.01 | 0.15 | 0.009 | 0.010 | 0.036 | 0.0024 | 0.081 | 0.0000 | 0.015 | 7.5 | 5.4 | 8.0 | |
| H | 0.0062 | 0.15 | 0.25 | 0.063 | 0.015 | 0.064 | 0.0018 | 0.020 | 0.0001 | 0.003 | 3.2 | 3.1 | 8.0 | |
| I | 0.0072 | 0.47 | 0.16 | 0.014 | 0.046 | 0.052 | 0.0008 | 0.036 | 0.0000 | 0.000 | 5.0 | 3.6 | 8.0 | |
| J | 0.0068 | 0.03 | 0.68 | 0.008 | 0.012 | 0.096 | 0.0023 | 0.032 | 0.0027 | 0.032 | 4.7 | 3.4 | 8.0 | |
| K | <u>0.0550</u> | 0.02 | 0.01 | 0.015 | 0.010 | 0.010 | 0.0020 | 0.000 | 0.0016 | 0.000 | <u>0.0</u> | 27.5 | 8.0 | Comparative Example |
| L | <u>0.0031</u> | 0.01 | 0.15 | 0.014 | 0.009 | 0.026 | <u>0.0038</u> | 0.027 | 0.0011 | 0.000 | <u>8.7</u> | 1.6 | 8.0 | |
| M | <u>0.0051</u> | 0.03 | 0.14 | 0.011 | 0.011 | 0.039 | 0.0020 | 0.024 | 0.0000 | 0.000 | 4.7 | 2.6 | 8.0 | |
| N | <u>0.0054</u> | 0.02 | 0.16 | 0.013 | 0.013 | 0.045 | 0.0018 | 0.033 | 0.0000 | 0.000 | 6.1 | 2.7 | 8.0 | |
| O | <u>0.0053</u> | 0.01 | 0.15 | 0.010 | 0.011 | 0.037 | 0.0021 | 0.042 | 0.0000 | 0.000 | 7.9 | 2.7 | 8.0 | |
| P | 0.0074 | 0.02 | 0.14 | 0.012 | 0.012 | 0.039 | 0.0016 | 0.025 | 0.0000 | 0.000 | <u>3.4</u> | 3.7 | 8.0 | |
| Q | 0.0094 | 0.01 | 0.15 | 0.012 | 0.010 | 0.043 | 0.0019 | 0.084 | 0.0000 | 0.000 | <u>8.9</u> | 4.7 | 8.0 | |
| R | <u>0.0115</u> | 0.03 | 0.15 | 0.008 | 0.011 | 0.036 | 0.0023 | 0.062 | 0.0000 | 0.000 | <u>5.4</u> | 5.8 | 8.0 | |
| S | <u>0.0118</u> | 0.01 | 0.16 | 0.011 | 0.010 | 0.042 | 0.0020 | 0.087 | 0.0000 | 0.000 | 7.4 | 5.9 | 8.0 | |
| T | 0.0108 | 0.02 | 0.14 | 0.013 | 0.014 | 0.031 | 0.0019 | 0.092 | 0.0000 | 0.000 | <u>8.5</u> | 5.4 | 8.0 | |
| U | 0.0075 | 0.01 | 0.15 | 0.012 | 0.010 | 0.044 | 0.0024 | 0.065 | 0.0000 | 0.000 | <u>8.7</u> | 3.8 | 8.0 | |
| V | 0.0098 | 0.02 | 0.14 | 0.011 | 0.009 | 0.039 | 0.0023 | 0.044 | 0.0000 | 0.000 | <u>4.5</u> | 4.9 | 8.0 | |
| W | <u>0.0018</u> | 0.02 | 0.16 | 0.015 | 0.010 | 0.042 | 0.0018 | 0.017 | 0.0003 | 0.015 | <u>9.4</u> | 0.9 | 8.0 | |
| X | <u>0.0040</u> | 0.01 | 0.20 | 0.012 | 0.010 | 0.035 | 0.0020 | 0.015 | 0.0000 | 0.000 | 3.8 | 2.0 | 8.0 | |
| Y | <u>0.0048</u> | 0.01 | 0.15 | 0.010 | 0.010 | 0.020 | <u>0.0035</u> | 0.020 | 0.0005 | 0.008 | 4.2 | 2.4 | 8.0 | |
| Z | 0.0075 | 0.32 | <u>0.76</u> | 0.028 | 0.018 | 0.035 | 0.0024 | 0.037 | 0.0002 | 0.005 | 4.9 | 3.8 | 8.0 | |

(Note)
Underlined values are conditions outside the scope of the present invention.

TABLE 2-1

| Test Number | Steel No. | Heating temperature of slab (° C.) | Finish temperature (° C.) | Coiling temperature (° C.) | Rolling reduction (%) | Sheet thickness (mm) | Annealing method | Annealing temperature (° C.) | Rolling reduction (%) |
|---|---|---|---|---|---|---|---|---|---|
| 1 | A | 1200 | 925 | 630 | 87 | 0.25 | CAL | 830 | 1.8 |
| 2 | B | 1200 | 925 | 630 | 87 | 0.25 | CAL | 830 | 1.8 |
| 3 | C | 1200 | 925 | 630 | 87 | 0.25 | CAL | 830 | 1.8 |
| 4 | D | 1200 | 925 | 630 | 88 | 0.25 | CAL | 830 | 1.8 |
| 5 | E | 1200 | 925 | 630 | 88 | 0.25 | CAL | 830 | 1.8 |
| 6 | F | 1200 | 925 | 630 | 88 | 0.25 | CAL | 820 | 1.8 |
| 7 | G | 1200 | 925 | 630 | 88 | 0.25 | CAL | 850 | 1.8 |
| 8 | H | 1230 | 960 | 630 | 87 | 0.25 | CAL | 830 | 1.8 |
| 9 | I | 1200 | 925 | 600 | 81 | 0.25 | CAL | 830 | 1.8 |
| 10 | J | 1100 | 870 | 670 | 87 | 0.25 | CAL | 810 | 1.8 |
| 11 | K | 1230 | 930 | 670 | 89 | 0.25 | CAL + BAF – OA | <u>720</u> | 1.8 |
| 12 | L | 1220 | 900 | 600 | 87 | 0.25 | CAL | 830 | 1.8 |
| 13 | M | 1230 | 910 | 620 | 87 | 0.25 | CAL | 820 | 1.8 |
| 14 | N | 1210 | 900 | 630 | 87 | 0.25 | CAL | 820 | 1.8 |
| 15 | O | 1230 | 920 | 610 | 87 | 0.25 | CAL | 820 | 1.8 |
| 16 | P | 1220 | 910 | 600 | 87 | 0.25 | CAL | 820 | 1.8 |
| 17 | Q | 1230 | 930 | 620 | 87 | 0.25 | CAL | 820 | 1.8 |
| 18 | R | 1230 | 920 | 630 | 87 | 0.25 | CAL | 820 | 1.8 |
| 19 | S | 1210 | 900 | 600 | 88 | 0.25 | CAL | 820 | 1.8 |
| 20 | T | 1200 | 900 | 610 | 88 | 0.25 | CAL | 820 | 1.8 |
| 21 | U | 1230 | 920 | 620 | 88 | 0.25 | CAL | 820 | 1.8 |
| 22 | V | 1220 | 910 | 630 | 88 | 0.25 | CAL | 820 | 1.8 |
| 23 | A | 1220 | 900 | 600 | 87 | 0.25 | CAL | <u>780</u> | 1.8 |
| 24 | A | 1220 | 900 | 600 | 87 | 0.25 | CAL | <u>870</u> | 1.8 |
| 25 | A | 1220 | <u>980</u> | 600 | 87 | 0.25 | CAL | 820 | 1.8 |
| 26 | A | 1220 | <u>850</u> | 600 | 87 | 0.25 | CAL | 820 | 1.8 |
| 27 | A | 1220 | 900 | <u>720</u> | 87 | 0.25 | CAL | 820 | 1.8 |
| 28 | A | 1220 | 900 | <u>430</u> | 87 | 0.25 | CAL | 820 | 1.8 |
| 29 | A | <u>1300</u> | 950 | 600 | 87 | 0.25 | CAL | 820 | 1.8 |
| 30 | W | 1220 | 920 | 550 | 89 | 0.25 | CAL | <u>780</u> | 1.8 |
| 31 | W | 1220 | 920 | 550 | 89 | 0.25 | CAL | 830 | 1.8 |
| 32 | X | 1220 | 920 | 630 | 87 | 0.25 | CAL | <u>780</u> | 1.8 |
| 33 | X | 1220 | 920 | 630 | 87 | 0.25 | CAL | 840 | 1.8 |
| 34 | Y | 1220 | 920 | 630 | 86 | 0.25 | CAL | <u>780</u> | 1.8 |
| 35 | Y | 1220 | 920 | 630 | 86 | 0.25 | CAL | 840 | 1.8 |
| 36 | Z | 1230 | 930 | 620 | 85 | 0.25 | CAL | 830 | 1.8 |
| 37 | A | 1200 | 925 | 630 | <u>92</u> | 0.25 | CAL | 830 | 1.8 |
| 38 | A | 1200 | 925 | 630 | <u>78</u> | 0.25 | CAL | 830 | 1.8 |
| 39 | A | 1200 | 925 | 630 | 82 | <u>0.55</u> | CAL | 830 | 1.8 |
| 40 | A | 1200 | 925 | 630 | 87 | 0.25 | CAL | 830 | <u>0.3</u> |

(Note)
Underlined values are conditions outside the scope of the present invention.

TABLE 2-2

| Test Numbers | Structure | Crystal grain size No. | Yield strength (MPa) | Tensile strength (MPa) | Total elongation (%) | Yield point elongation (%) | Average r value | Δr | Note |
|---|---|---|---|---|---|---|---|---|---|
| 1 | Ferrite single-phase | 11.2 | 225 | 346 | 39.9 | 0.0 | 1.45 | −0.29 | Inventive |
| 2 | Ferrite single-phase | 11.1 | 238 | 352 | 38.4 | 0.0 | 1.46 | −0.22 | Example |
| 3 | Ferrite single-phase | 11.1 | 236 | 354 | 39.6 | 0.0 | 1.36 | −0.20 | |
| 4 | Ferrite single-phase | 11.5 | 258 | 363 | 36.0 | 0.0 | 1.46 | −0.22 | |
| 5 | Ferrite single-phase | 12.0 | 252 | 365 | 37.1 | 0.0 | 1.40 | −0.22 | |
| 6 | Ferrite single-phase | 11.9 | 232 | 348 | 40.1 | 0.0 | 1.80 | −0.28 | |
| 7 | Ferrite single-phase | 11.1 | 254 | 361 | 38.1 | 0.0 | 1.85 | −0.18 | |
| 8 | Ferrite single-phase | 11.8 | 247 | 380 | 34.7 | 0.0 | 1.42 | −0.12 | |
| 9 | Ferrite single-phase | 11.1 | 253 | 388 | 33.9 | 0.0 | 1.36 | −0.25 | |
| 10 | Ferrite single-phase | 11.6 | 242 | 372 | 35.8 | 0.0 | 1.41 | −0.07 | |
| 11 | Ferrite single-phase | 11.8 | 252 | 374 | 35.5 | 0.0 | <u>0.91</u> | −0.22 | Comparative |
| 12 | Ferrite single-phase | <u>9.3</u> | <u>200</u> | 334 | 42.3 | 0.0 | 1.80 | −0.25 | Example |
| 13 | Ferrite single-phase | <u>10.1</u> | 219 | 342 | 41.5 | 0.0 | 1.38 | −0.09 | |
| 14 | Ferrite single-phase | <u>10.3</u> | 232 | 348 | 40.9 | 0.0 | 1.39 | −0.18 | |

TABLE 2-2-continued

| | | Microstructure | Mechanical characteristics | | | Yield point | r value | | |
|---|---|---|---|---|---|---|---|---|---|
| Test Numbers | Structure | Crystal grain size No. | Yield strength (MPa) | Tensile strength (MPa) | Total elongation (%) | elongation (%) | Average r value | Δr | Note |
| 15 | Ferrite single-phase | 10.2 | 218 | 346 | 40.1 | 0.0 | 1.56 | −0.20 | |
| 16 | Ferrite single-phase | 11.3 | 243 | 351 | 39.5 | 0.3 | 1.36 | −0.11 | |
| 17 | Ferrite single-phase | 10.1 | 277 | 370 | 35.1 | 0.0 | 1.72 | −0.29 | |
| 18 | Ferrite single-phase | 11.2 | 292 | 391 | 31.6 | 0.5 | 1.59 | −0.30 | |
| 19 | Ferrite single-phase | 10.3 | 295 | 395 | 31.4 | 0.0 | 2.09 | −0.18 | |
| 20 | Ferrite single-phase | 10.2 | 281 | 376 | 34.8 | 0.0 | 1.69 | −0.28 | |
| 21 | Ferrite single-phase | 10.4 | 241 | 356 | 37.4 | 0.0 | 1.37 | −0.30 | |
| 22 | Ferrite single-phase | 11.5 | 248 | 360 | 36.8 | 0.5 | 1.38 | −0.25 | |
| 23 | Ferrite single-phase | 11.4 | 260 | 371 | 36.9 | 0.0 | 1.34 | −0.35 | |
| 24 | Ferrite single-phase | 10.6 | 190 | 321 | 42.5 | 0.0 | 1.52 | −0.27 | |
| 25 | Ferrite single-phase | 11.0 | 220 | 337 | 39.8 | 0.0 | 1.27 | −0.28 | |
| 26 | Ferrite single-phase | 11.1 | 231 | 356 | 38.0 | 0.0 | 1.50 | −0.42 | |
| 27 | Ferrite single-phase | 10.3 | 222 | 340 | 40.0 | 0.0 | 1.49 | −0.25 | |
| 28 | Ferrite single-phase | 11.0 | 235 | 361 | 37.1 | 0.0 | 1.28 | −0.48 | |
| 29 | Ferrite single-phase | 10.5 | 228 | 351 | 38.4 | 0.0 | 1.23 | −0.30 | |
| 30 | Ferrite single-phase | 11.0 | 240 | 349 | 36.5 | 0.0 | 1.25 | −0.28 | |
| 31 | Ferrite single-phase | 10.2 | 205 | 319 | 39.3 | 0.0 | 1.35 | −0.25 | |
| 32 | Ferrite single-phase | 11.6 | 254 | 367 | 38.5 | 0.0 | 1.25 | −0.02 | |
| 33 | Ferrite single-phase | 10.1 | 202 | 330 | 42.7 | 0.0 | 1.37 | −0.02 | |
| 34 | Ferrite single-phase | 11.8 | 259 | 372 | 38.1 | 0.0 | 1.27 | −0.03 | |
| 35 | Ferrite single-phase | 10.3 | 207 | 354 | 42.4 | 0.0 | 1.38 | −0.03 | |
| 36 | Ferrite single-phase | 11.1 | 281 | 433 | 29.8 | 0.0 | 1.26 | −0.32 | |
| 37 | Ferrite single-phase | 11.1 | 227 | 348 | 38.2 | 0.0 | 1.40 | −0.37 | |
| 38 | Ferrite single-phase | 11.0 | 221 | 343 | 38.7 | 0.0 | 1.38 | −0.42 | |
| 39 | Ferrite single-phase | 11.1 | 219 | 341 | 35.4 | 0.0 | 1.28 | −0.34 | |
| 40 | Ferrite single-phase | 11.2 | 247 | 348 | 38.7 | 0.6 | 1.39 | −0.29 | |

(Note)
Underlined values are conditions outside the scope of the present invention.

TABLE 3

| Composition of plating bath | NiSO$_4$·6H$_2$O: 340 g/L |
| | NiCl$_2$: 70 g/L |
| | H$_3$BO$_3$: 45 g/L |
| | pH: 4.0 |

TABLE 3-continued

| Temperature of plating bath | 60° C. |
| Anode | Soluble anode (Ni) |
| Cathode current density | 20 A/dm$^2$ |

TABLE 4-1

| | | Hot rolling conditions | | | Cold rolling conditions | | Annealing conditions | | Temper rolling |
|---|---|---|---|---|---|---|---|---|---|
| | | Heating | | | | | | | |
| Test Number | Steel No. | temperature of slab (° C.) | Finish temperature (° C.) | Coiling temperature (° C.) | Rolling reduction (%) | Sheet thickness (mm) | Annealing method | Annealing temperature (° C.) | Rolling reduction (%) |
| 1B | A | 1200 | 925 | 630 | 87 | 0.25 | CAL | 830 | 1.8 |
| 1B2 | A | 1200 | 925 | 630 | 87 | 0.25 | CAL | 830 | 1.8 |
| 1B3 | A | 1200 | 925 | 630 | 87 | 0.25 | CAL | 830 | 1.8 |
| 2B | B | 1200 | 925 | 630 | 87 | 0.25 | CAL | 830 | 1.8 |
| 3B | C | 1200 | 925 | 630 | 87 | 0.25 | CAL | 830 | 1.8 |
| 4B | D | 1200 | 925 | 630 | 88 | 0.25 | CAL | 830 | 1.8 |
| 5B | E | 1200 | 925 | 630 | 88 | 0.25 | CAL | 830 | 1.8 |
| 6B | F | 1200 | 925 | 630 | 88 | 0.25 | CAL | 820 | 1.8 |
| 7B | G | 1200 | 925 | 630 | 88 | 0.25 | CAL | 850 | 1.8 |
| 8B | H | 1230 | 960 | 630 | 87 | 0.25 | CAL | 830 | 1.8 |
| 9B | I | 1200 | 925 | 600 | 81 | 0.25 | CAL | 830 | 1.8 |
| 10B | J | 1100 | 870 | 670 | 87 | 0.25 | CAL | 810 | 1.8 |
| 11B | K | 1230 | 930 | 670 | 89 | 0.25 | CAL + BAF - OA | 720 | 1.8 |
| 12B | L | 1220 | 900 | 600 | 87 | 0.25 | CAL | 830 | 1.8 |
| 13B | M | 1230 | 910 | 620 | 87 | 0.25 | CAL | 820 | 1.8 |
| 14B | N | 1210 | 900 | 630 | 87 | 0.25 | CAL | 820 | 1.8 |
| 15B | O | 1230 | 920 | 610 | 87 | 0.25 | CAL | 820 | 1.8 |
| 16B | P | 1220 | 910 | 600 | 87 | 0.25 | CAL | 820 | 1.8 |
| 17B | Q | 1230 | 930 | 620 | 87 | 0.25 | CAL | 820 | 1.8 |
| 18B | R | 1230 | 920 | 630 | 87 | 0.25 | CAL | 820 | 1.8 |
| 19B | S | 1210 | 900 | 600 | 88 | 0.25 | CAL | 820 | 1.8 |

TABLE 4-1-continued

| | | Hot rolling conditions | | | Cold rolling conditions | | Annealing conditions | | Temper rolling |
|---|---|---|---|---|---|---|---|---|---|
| | | Heating | | | | | | | |
| Test Number | Steel No. | temperature of slab (° C.) | Finish temperature (° C.) | Coiling temperature (° C.) | Rolling reduction (%) | Sheet thickness (mm) | Annealing method | Annealing temperature (° C.) | Rolling reduction (%) |
| 20B | T | 1200 | 900 | 610 | 88 | 0.25 | CAL | 820 | 1.8 |
| 21B | U | 1230 | 920 | 620 | 88 | 0.25 | CAL | 820 | 1.8 |
| 22B | V | 1220 | 910 | 630 | 88 | 0.25 | CAL | 820 | 1.8 |
| 23B | A | 1220 | 900 | 600 | 87 | 0.25 | CAL | <u>780</u> | 1.8 |
| 24B | A | 1220 | 900 | 600 | 87 | 0.25 | CAL | <u>870</u> | 1.8 |
| 25B | A | 1220 | <u>980</u> | 600 | 87 | 0.25 | CAL | 820 | 1.8 |
| 26B | A | 1220 | <u>850</u> | 600 | 87 | 0.25 | CAL | 820 | 1.8 |
| 27B | A | 1220 | 900 | <u>720</u> | 87 | 0.25 | CAL | 820 | 1.8 |
| 28B | A | 1220 | 900 | <u>430</u> | 87 | 0.25 | CAL | 820 | 1.8 |
| 29B | A | <u>1300</u> | 950 | 600 | 87 | 0.25 | CAL | 820 | 1.8 |
| 30B | W | 1220 | 920 | 550 | 89 | 0.25 | CAL | <u>780</u> | 1.8 |
| 31B | W | 1220 | 920 | 550 | 89 | 0.25 | CAL | 830 | 1.8 |
| 32B | X | 1220 | 920 | 630 | 87 | 0.25 | CAL | <u>780</u> | 1.8 |
| 33B | X | 1220 | 920 | 630 | 87 | 0.25 | CAL | 840 | 1.8 |
| 34B | Y | 1220 | 920 | 630 | 86 | 0.25 | CAL | <u>780</u> | 1.8 |
| 35B | Y | 1220 | 920 | 630 | 86 | 0.25 | CAL | 840 | 1.8 |
| 35B2 | Y | 1200 | 920 | 630 | 86 | 0.25 | CAL | 840 | 1.8 |
| 35B3 | Y | 1200 | 920 | 630 | 86 | 0.25 | CAL | 840 | 1.8 |
| 36B | Z | 1230 | 930 | 620 | 85 | 0.25 | CAL | 830 | 1.8 |
| 37B | A | 1200 | 925 | 630 | <u>92</u> | 0.25 | CAL | 830 | 1.8 |
| 38B | A | 1200 | 925 | 630 | <u>78</u> | 0.25 | CAL | 830 | 1.8 |
| 39B | A | 1200 | 925 | 630 | 82 | <u>0.55</u> | CAL | 830 | 1.8 |
| 40B | A | 1200 | 925 | 630 | 87 | 0.25 | CAL | 830 | <u>0.3</u> |

(Note)
Underlined values are conditions outside the scope of the present invention.

TABLE 4-2

| | | Microstructure | Mechanical characteristics | | | | r value | | Ni diffusion plating | | |
|---|---|---|---|---|---|---|---|---|---|---|---|
| Test Numbers | Structure | Crystal grain size No. | Yield strength (MPa) | Tensile strength (MPa) | Total elongation (%) | Yield point elongation (%) | Average r value | Δr | Adhesion amount of Ni (g/m$^2$) | Concentration of Fe in surface layer (mass %) | Note |
| Note1B | Ferrite single-phase | 11.2 | 227 | 349 | 39.3 | 0.0 | 1.41 | −0.27 | 13.5 | 16 | Inventive Example |
| 1B2 | Ferrite single-phase | 11.2 | 225 | 347 | 39.5 | 0.0 | 1.42 | −0.27 | 4.2 | 82 | |
| 1B3 | Ferrite single-phase | 11.2 | 232 | 356 | 38.9 | 0.0 | 1.38 | −0.25 | 30.5 | 0 | |
| 2B | Ferrite single-phase | 11.1 | 240 | 354 | 37.8 | 0.0 | 1.42 | −0.20 | 13.5 | 17 | |
| 3B | Ferrite single-phase | 11.1 | 237 | 358 | 39.0 | 0.0 | 1.36 | −0.19 | 13.5 | 16 | |
| 4B | Ferrite single-phase | 11.5 | 261 | 366 | 35.4 | 0.0 | 1.42 | −0.21 | 13.5 | 18 | |
| 5B | Ferrite single-phase | 12.0 | 254 | 367 | 36.6 | 0.0 | 1.36 | −0.20 | 13.5 | 16 | |
| 6B | Ferrite single-phase | 11.9 | 235 | 355 | 38.9 | 0.0 | 1.72 | −0.26 | 6.1 | 68 | |
| 7B | Ferrite single-phase | 11.1 | 257 | 364 | 37.5 | 0.0 | 1.77 | −0.17 | 17.6 | 15 | |
| 8B | Ferrite single-phase | 11.8 | 250 | 383 | 34.1 | 0.0 | 1.40 | −0.11 | 13.5 | 16 | |
| 9B | Ferrite single-phase | 11.1 | 255 | 390 | 33.3 | 0.0 | 1.36 | −0.23 | 13.5 | 17 | |
| 10B | Ferrite single-phase | 11.6 | 245 | 375 | 35.2 | 0.0 | 1.39 | −0.06 | 13.5 | 16 | |
| 11B | Ferrite single-phase | 11.8 | 254 | 378 | 34.9 | 0.0 | <u>0.90</u> | −0.21 | 13.5 | 0 | Comparative Example |
| 12B | Ferrite single-phase | <u>9.3</u> | <u>204</u> | 339 | 40.9 | 0.0 | 1.71 | −0.23 | 13.5 | 16 | |
| 13B | Ferrite single-phase | <u>10.1</u> | <u>219</u> | 345 | 40.8 | 0.0 | 1.35 | −0.08 | 13.5 | 9 | |
| 14B | Ferrite single-phase | <u>10.3</u> | 234 | 350 | 40.3 | 0.0 | 1.36 | −0.17 | 13.5 | 10 | |

TABLE 4-2-continued

| Test Numbers | Microstructure Structure | Microstructure Crystal grain size No. | Mechanical characteristics Yield strength (MPa) | Mechanical characteristics Tensile strength (MPa) | Mechanical characteristics Total elongation (%) | Mechanical characteristics Yield point elongation (%) | r value Average r value | r value Δr | Ni diffusion plating Adhesion amount of Ni (g/m$^2$) | Ni diffusion plating Concentration of Fe in surface layer (mass %) | Note |
|---|---|---|---|---|---|---|---|---|---|---|---|
| 15B | Ferrite single-phase | 10.2 | 219 | 349 | 39.5 | 0.0 | 1.52 | −0.19 | 13.5 | 9 | |
| 16B | Ferrite single-phase | 11.3 | 256 | 354 | 38.9 | 0.3 | 1.35 | −0.10 | 13.5 | 9 | |
| 17B | Ferrite single-phase | 10.1 | 279 | 372 | 34.6 | 0.0 | 1.64 | −0.27 | 13.5 | 17 | |
| 18B | Ferrite single-phase | 11.2 | 295 | 394 | 31.1 | 0.5 | 1.55 | −0.28 | 13.5 | 9 | |
| 19B | Ferrite single-phase | 10.3 | 298 | 398 | 30.8 | 0.0 | 2.01 | −0.17 | 13.5 | 11 | |
| 20B | Ferrite single-phase | 10.2 | 283 | 379 | 34.2 | 0.0 | 1.63 | −0.26 | 13.5 | 9 | |
| 21B | Ferrite single-phase | 10.4 | 242 | 358 | 36.9 | 0.0 | 1.35 | −0.28 | 13.5 | 10 | |
| 22B | Ferrite single-phase | 11.5 | 249 | 363 | 36.2 | 0.5 | 1.36 | −0.23 | 13.5 | 9 | |
| 23B | Ferrite single-phase | 11.4 | 262 | 374 | 36.3 | 0.0 | 1.34 | −0.33 | 13.5 | 0 | |
| 24B | Ferrite single-phase | 10.6 | 192 | 324 | 41.9 | 0.0 | 1.49 | −0.25 | 13.5 | 37 | |
| 25B | Ferrite single-phase | 11.0 | 222 | 340 | 39.3 | 0.0 | 1.25 | −0.26 | 13.5 | 9 | |
| 26B | Ferrite single-phase | 11.1 | 233 | 358 | 37.4 | 0.0 | 1.46 | −0.40 | 13.5 | 10 | |
| 27B | Ferrite single-phase | 10.3 | 225 | 343 | 39.4 | 0.0 | 1.44 | −0.23 | 13.5 | 9 | |
| 28B | Ferrite single-phase | 11.0 | 237 | 364 | 36.5 | 0.0 | 1.26 | −0.45 | 13.5 | 10 | |
| 29B | Ferrite single-phase | 10.5 | 230 | 353 | 37.9 | 0.0 | 1.21 | −0.28 | 13.5 | 10 | |
| 30B | Ferrite single-phase | 11.0 | 242 | 352 | 35.9 | 0.0 | 1.23 | −0.29 | 13.5 | 0 | |
| 31B | Ferrite single-phase | 10.2 | 207 | 322 | 38.7 | 0.0 | 1.35 | −0.26 | 13.5 | 16 | |
| 32B | Ferrite single-phase | 11.6 | 257 | 370 | 37.9 | 0.0 | 1.22 | −0.03 | 13.5 | 0 | |
| 33B | Ferrite single-phase | 10.1 | 204 | 332 | 42.5 | 0.0 | 1.35 | −0.02 | 13.5 | 25 | |
| 34B | Ferrite single-phase | 11.8 | 262 | 375 | 37.6 | 0.0 | 1.25 | −0.04 | 13.5 | 0 | |
| 35B | Ferrite single-phase | 10.3 | 209 | 356 | 41.9 | 0.0 | 1.36 | −0.03 | 13.5 | 23 | |
| 35B2 | Ferrite single-phase | 10.3 | 208 | 355 | 42.1 | 0.0 | 1.37 | −0.03 | 4.3 | 81 | |
| 35B3 | Ferrite single-phase | 10.3 | 214 | 363 | 41.5 | 0.0 | 1.33 | −0.05 | 27.8 | 0 | |
| 36B | Ferrite single-phase | 11.1 | 284 | 436 | 29.3 | 0.0 | 1.23 | −0.33 | 13.5 | 18 | |
| 37B | Ferrite single-phase | 11.1 | 229 | 350 | 37.5 | 0.0 | 1.37 | −0.38 | 13.5 | 16 | |
| 38B | Ferrite single-phase | 11.0 | 223 | 345 | 38.1 | 0.0 | 1.36 | −0.44 | 13.5 | 15 | |
| 39B | Ferrite single-phase | 11.1 | 220 | 343 | 34.9 | 0.0 | 1.25 | −0.36 | 13.5 | 16 | |
| 40B | Ferrite single-phase | 11.2 | 249 | 350 | 38.1 | 0.6 | 1.36 | −0.30 | 13.5 | 17 | |

(Note)
Underlined values are conditions outside the scope of the present invention.

[Test Results]

With reference to Table 2-1 and Table 2-2, it was found that the chemical compositions of Test Numbers 1 to 10 were appropriate and F1 was also in the range of Expression (1). Furthermore, the manufacturing conditions were also appropriate. Therefore, in the cold rolled steel sheets with these test numbers, the crystal grain size numbers were as high as 11.0 or more, and the ferrite grains were fine. In addition, the average plastic strain ratios $r_m$ were more than 1.35, and the in-plane anisotropy Δr was −0.30 to +0.15.

Furthermore, in all of the test numbers of Test Numbers 1 to 10, in the L direction of the cold rolled steel sheets after the progressive ageing treatment, the yield strengths YP were 220 to 290 MPa, the tensile strengths TS were 330 to 390 MPa, the total elongations EL were 32% or more, and the yield point elongations YP-EL were 0%.

That is, these cold rolled steel sheets had excellent mechanical characteristics, were excellent in terms of press formability, surface roughening resistance, and earing resistance, and had non ageing property.

With reference to Table 4-1 and Table 4-2, it was found that the chemical compositions of Test Numbers 1B to 10B were appropriate and F1 was also in the range of Expression (1). Furthermore, the manufacturing conditions were also appropriate. Therefore, in the Ni diffusion plated cold rolled steel sheets with these test numbers, the crystal grain size numbers were as high as 11.0 or more, and the ferrite grains were fine. In addition, the average plastic strain ratios $r_m$ were more than 1.35, and the in-plane anisotropy Δr was −0.30 to +0.15.

Furthermore, in all of the test numbers of Test Numbers 1B to 10B, in the L direction of the cold rolled steel sheets after the progressive ageing treatment, the yield strengths YP were 220 to 290 MPa, the tensile strengths TS were 330 to 390 MPa, the total elongations EL were 32% or more, and the yield point elongations YP-EL were 0%.

That is, these Ni diffusion plated cold rolled steel sheets had excellent mechanical characteristics, were excellent in terms of press formability, surface roughening resistance, and earing resistance, and had non ageing property.

In addition, except for Test Numbers 1B2 and 1B3, the concentrations of Fe in the surface layers of the Ni diffusion plated layers were also in a range of 3% to 80% in terms of the mass % in all of the test numbers of Test Numbers 1B to 10B.

Furthermore, except for Test Number 1B2, the adhesion amounts of Ni were also 4.5 g/m² or more in all of the test numbers of Test Numbers 1B to 10B. In addition, except for 1B2 and 6B, the adhesion amounts of Ni were also 9.0 g/m² or more. Therefore, sufficient corrosion resistance can be ensured.

In 1B2, the adhesion amount of Ni was as extremely small as 4.2 g/m², and thus, in a case where the steel sheet is annealed under a condition under which the characteristics were sufficiently developed, the concentration of Fe in the surface layer of the Ni-plated layer exceeded 80%, and it is concerned that the corrosion resistance may become a problem. In 1B3, the adhesion amount of Ni was as extremely large as 30.5 g/m², and thus, as a result of the steel sheet being annealed under a condition under which the characteristics were sufficiently developed, a Ni layer remained in the surface layer of the plated layer. The softened Ni layer was likely to cause adhesion to a die during press forming.

On the other hand, in Test Numbers 11 and 11B, the amounts of C were excessively large. Furthermore, in the annealing step, CAL and BAF-OA were carried out, the annealing temperatures ST were also as low as lower than 800° C. As a result, the average plastic strain ratios $r_m$ were as low as 1.35 or less. In Test Number 11B, the concentration of Fe in the surface layer of the Ni diffusion plated layer was less than 3% by mass, and under the annealing conditions of Test Number 8B, the alloying of Ni and Fe did not proceed up to the surface layer of the plated layer in a case where the adhesion amount of Ni was 13.5 g/m².

In Test Numbers 12 and 12B, the amounts of C were excessively small, and the amounts of N were excessively large. Furthermore, F1 exceeded the upper limit of Expression (1). As a result, the crystal grain size numbers became less than 11.0. Furthermore, the yield strengths were also as low as less than 220 MPa. In Test Number 12B, the concentration of Fe in the surface layer of the Ni diffusion plated layer reached 16%; however, under this annealing condition, the crystal grain size number became 9.3, that is, the crystal grains became very coarse.

In Test Numbers 13 and 13B, the amounts of C were excessively small. As a result, the crystal grain size number became less than 11.0. Furthermore, the yield strength was also as low as less than 220 MPa. In Test Number 13B, the concentration of Fe in the surface layer of the Ni diffusion plated layer was 9%, but the crystal grain size number was less than 11.0. In addition, the average plastic strain ratio $r_m$ was as low as 1.35 or less.

In Test Numbers 14 and 14B, the amounts of C were excessively small. As a result, the crystal grain size number became less than 11.0. In Test Number 14B, the concentration of Fe in the surface layer of the Ni diffusion plated layer was almost the same as that in 13B and was in an appropriate range, but the crystal grain diameters were large.

In Test Numbers 15 and 15B, the amounts of C were excessively small. As a result, the crystal grain size number became less than 11.0. Furthermore, the yield strength was also as low as less than 220 MPa. In Test Number 15B, the concentration of Fe in the surface layer of the Ni diffusion plated layer was almost the same as that in 13B.

In Test Numbers 16 and 16B, F1 was less than the lower limit of Expression (1). Therefore, the yield point elongation YP-EL was higher than 0%. In 16B, the concentration of Fe in the surface layer of the Ni diffusion plated layer was in an appropriate range. In addition, the average plastic strain ratio $r_m$ was as low as 1.35 or less.

In Test Numbers 17 and 17B, F1 exceeded the upper limit of Expression (1). As a result, the crystal grain size number was less than 11.0. In Test Number 17B, the concentration of Fe in the surface layer of the Ni diffusion plated layer was in an appropriate range.

In Test Numbers 18 and 18B, the amounts of C were excessively large, and, furthermore, F1 was less than the lower limit of Expression (1). Therefore, the yield point elongation YP-EL was higher than 0%. Furthermore, the yield strength YP exceeded 390 MPa, the tensile strength TS exceeded 390 MPa, and the total elongation EL was less than 32%. In 18B, the concentration of Fe in the surface layer of the Ni diffusion plated layer was in an appropriate range.

In Test Numbers 19 and 19B, the amounts of C were excessively large. Therefore, the crystal grain size number was less than 11.0. Furthermore, the yield strength YP exceeded 390 MPa, the tensile strength TS exceeded 390 MPa, and the total elongation EL was less than 32%. In 19B, the concentration of Fe in the surface layer of the Ni diffusion plated layer was in an appropriate range.

In Test Numbers 20 and 20B, F1 exceeded the upper limit of Expression (1). As a result, the crystal grain size number was less than 11.0. In 20B, the concentration of Fe in the surface layer of the Ni diffusion plated layer was in an appropriate range.

In Test Numbers 21 and 21B, F1 exceeded the upper limit of Expression (1). Therefore, the crystal grain size number was less than 11.0. In 21B, the concentration of Fe in the surface layer of the Ni diffusion plated layer was in an appropriate range. In addition, the average plastic strain ratio $r_m$ was as low as 1.35 or less.

In Test Numbers 22 and 22B, F1 was less than the lower limit of Expression (1). Therefore, the yield point elongation YP-EL was higher than 0%. In 22B, the concentration of Fe in the surface layer of the Ni diffusion plated layer was in an appropriate range.

In Test Numbers 23 and 23B, the annealing temperatures ST were excessively low. Therefore, the average plastic strain ratios $r_m$ were as low as 1.35 or less, and, furthermore, the in-plane anisotropy Δr was lower than −0.30. Under the annealing condition of 23B, Fe was not detected in the surface layer of the Ni diffusion plated layer.

In Test Numbers 24 and 24B, the annealing temperatures ST were excessively high. Therefore, the crystal grain size numbers became less than 11.0, and the crystal grains were coarsened. Furthermore, the yield strength was less than 220 MPa, and the tensile strength was as low as less than 330 MPa. In 24B, the concentration of Fe in the surface layer of the Ni diffusion plated layer was in an appropriate range.

In Test Numbers 25 and 25B, the finish temperatures FT were excessively high. Therefore, the average plastic strain ratios $r_m$ were as low as 1.35 or less. In 25B, the concentration of Fe in the surface layer of the Ni diffusion plated layer was in an appropriate range.

In Test Numbers 26 and 26B, the finish temperatures FT were excessively low. Therefore, the in-plane anisotropy Δr was lower than −0.30. In 26B, the concentration of Fe in the surface layer of the Ni diffusion plated layer was in an appropriate range.

In Test Numbers 27 and 27B, the coiling temperatures CT were excessively high. Therefore, the crystal grain size numbers became less than 11.0. In 27B, the concentration of Fe in the surface layer of the Ni diffusion plated layer was in an appropriate range.

In Test Numbers 28 and 28B, the coiling temperatures CT were excessively low. Therefore, the average plastic strain ratios $r_m$ were as low as 1.35 or less, and, furthermore, the in-plane anisotropy Δr was lower than −0.30. In 28B, the concentration of Fe in the surface layer of the Ni diffusion plated layer was in an appropriate range.

In Test Numbers 29 and 29B, the slab heating temperatures were excessively high. Therefore, the crystal grain size numbers became less than 11.0. Furthermore, the average plastic strain ratios r were as low as 1.35 or less. In 29B, the concentration of Fe in the surface layer of the Ni diffusion plated layer was in an appropriate range.

In Test Numbers 30 and 30B, the amounts of C were excessively small, and, furthermore, F1 exceeded the upper limit of Expression (1). Furthermore, the annealing temperatures ST were excessively low. As a result, the average plastic strain ratios r were as low as 1.35 or less. In 30B, Fe was not detected in the surface layer of the Ni diffusion plated layer. In the chemical composition of a steel T, an appropriate annealing temperature is considered to be 780° C. with an assumption that a preferred crystal grain size is ensured. However, under such an annealing condition, the adhesion amount of Ni was large, and it was not possible to make the alloying of Ni and Fe proceed up to the surface layer of the Ni diffusion plated layer.

In Test Numbers 31 and 31B, the amounts of C were excessively small, and, furthermore, F1 exceeded the upper limit of Expression (1). Furthermore, the crystal grain size numbers became less than 11.0. Furthermore, the yield strengths were as low as less than 220 MPa, and the tensile strengths were as low as less than 330 MPa. In 31B, the concentration of Fe in the surface layer of the Ni diffusion plated layer was in an appropriate range.

In Test Numbers 32 and 32B, the amounts of C were excessively small. Furthermore, the annealing temperatures ST were excessively low. As a result, the average plastic strain ratios r were as low as 1.35 or less. In 32B, Fe was not detected in the surface layer of the Ni diffusion plated layer. An appropriate annealing temperature of a steel X is considered to be 780° C. with an assumption that a preferred crystal grain size is ensured, and, under such an annealing condition, the adhesion amount of Ni was large, and it was not possible to make the alloying of Ni and Fe proceed up to the surface layer of the Ni diffusion plated layer.

In Test Numbers 33 and 33B, the amounts of C were excessively small. Therefore, the crystal grain size numbers became less than 11.0. Furthermore, the yield strengths were as low as less than 220 MPa. In 33B, the concentration of Fe in the surface layer of the Ni diffusion plated layer was in an appropriate range. In addition, the average plastic strain ratio was as low as 1.35 or less.

In Test Numbers 34 and 34B, the amounts of C were excessively small. Furthermore, the annealing temperatures ST were excessively low. As a result, the average plastic strain ratios r were as low as 1.35 or less. In 34B, Fe was not detected in the surface layer of the Ni diffusion plated layer. An appropriate annealing temperature of a steel Y is considered to be 780° C. with an assumption that a preferred crystal grain size is ensured, and, under such an annealing condition, the adhesion amount of Ni was large, and it was not possible to make the alloying of Ni and Fe proceed up to the surface layer of the Ni diffusion plated layer.

In Test Numbers 35 and 35B, the amounts of C were excessively small. Therefore, the crystal grain size numbers became less than 11.0. Furthermore, the yield strengths were as low as less than 220 MPa. In 35B, the concentration of Fe in the surface layer of the Ni diffusion plated layer was in an appropriate range.

Test Number 35B2 is an example of the same condition as that of Test Number 35B except for the fact the adhesion amount of Ni in the Ni plating. In Test Number 35B2, the adhesion amount of Ni in the Ni plating was excessively small. Therefore, the concentration of Fe in the surface layer of the Ni diffusion plated layer was more than 80% by mass.

Test Number 35B3 is an example of the same condition as that of Test Number 35B except for the fact the adhesion amount of Ni in the Ni plating. In Test Number 35B3, the adhesion amount of Ni in the Ni plating was excessively large. Therefore, the concentration of Fe in the surface layer of the Ni diffusion plated layer was less than 3% by mass. In addition, the average plastic strain ratio was as low as 1.35 or less.

In Test Numbers 36 and 36B, the amounts of Mn were excessively large. As a result, the tensile strengths were as high as more than 390 MPa. Therefore, the total elongations were less than 32%, the plastic strain ratios $r_m$ were as low as 1.35 or less, and, furthermore, the in-plane anisotropy Δr was lower than −0.30.

In Test Numbers 37 and 37B, the rolling reductions in cold rolling were higher than 90%. As a result, the in-plane anisotropy Δr was lower than −0.30.

In Test Numbers 38 and 38B, the rolling reductions in cold rolling were less than 80%. As a result, the in-plane anisotropy Δr was lower than −0.30.

In Test Numbers 39 and 39B, the sheet thicknesses were larger than 0.50 mm. Therefore, the plastic strain ratios $r_m$ were as low as 1.35 or less, and, furthermore, the in-plane anisotropy Δr was lower than −0.30.

In Test Numbers 40 and 40B, the temper rolling reductions were less than 0.5%. Therefore, the yield point elongations YP-EL were higher than 0%.

Hitherto, the embodiment of the present invention has been described. However, the above-described embodiment is simply an example for carrying out the present invention. Therefore, the present invention is not limited to the above-described embodiment, and it is possible to appropriately modify and carry out the above-described embodiment within the scope of the gist of the present invention.

INDUSTRIAL APPLICABILITY

According to the present invention, it is possible to provide a fine-grained cold rolled steel sheet for a drawn can which is excellent in terms of press formability, surface roughening resistance of a can, and earing resistance, and does not age.

What is claimed is:

1. A cold rolled steel sheet for a drawn can comprising, as a chemical composition, by mass %:
   C: 0.0060% to 0.0110%;
   Si: 0.50% or less;
   Mn: 0.70% or less;
   P: 0.070% or less;
   S: 0.050% or less;
   Sol. Al: 0.005% to 0.100%;
   N: less than 0.0025%;
   Nb satisfying Expression (1);
   B: 0% to 0.0030%; and
   Ti: 0% to 0.035%
   with a remainder of Fe and an impurity,
   wherein the steel sheet for a drawn can includes a ferrite single-phase structure with a crystal grain size number of 11.0 or more,
   a sheet thickness is 0.15 to 0.50 mm,
   in an L direction of the steel sheet after an ageing treatment at 100° C. for one hour,
      a yield strength YP is 220 to 290 MPa,
      a tensile strength TS is 330 to 390 MPa,
      a total elongation EL is 32% or more,
      a yield point elongation YP-EL is 0%, and
   in the steel sheet after the ageing treatment at 100° C. for one hour,
      an average plastic strain ratio $r_m$ is more than 1.35, and
      an in-plane anisotropy $\Delta r$ is −0.30 to +0.15, $$500 \times C \leq Nb/C \leq 8.0 \tag{1}$$

here, to element symbols in Expression (1), the amounts (% by mass) of the corresponding elements are assigned.

2. The cold rolled steel sheet for a drawn can according to claim 1, further including:
   any one of the group consisting of a Ni-plated layer, a Ni diffusion plated layer, a Sn-plated layer, and a tinfree steel (TFS)-plated layer on a surface.

3. The cold rolled steel sheet for a drawn can according to claim 2,
   wherein the cold rolled steel sheet includes the Ni diffusion plated layer, and the Ni diffusion plated layer has an adhesion amount of Ni of 9.0 to 27.0 g/m², and
   wherein, in the case of analyzing a concentration of Fe in a surface layer of the Ni diffusion plated layer by XPS, the concentration of Fe is 3% to 80% by mass %.

4. The cold rolled steel sheet for a drawn can according to claim 3,
   wherein the Ni diffusion plated layer has an adhesion amount of Ni of 9.0 to 22.5 g/m².

5. A method for manufacturing the cold rolled steel sheet for a drawn can according to claim 1, the method comprising:
   heating a cast piece having the chemical composition to 1,000° C. to 1,280° C., carrying out a finish rolling at a rolling finish temperature of 870° C. to 960° C., cooling the finish-rolled cast piece after finish rolling, and coiling the finish-rolled cast piece at 450° C. or higher and lower than 700° C., thereby manufacturing a hot rolled steel sheet;
   carrying out a cold rolling on the hot rolled steel sheet at a cold rolling reduction of 80% or more and less than 90%, thereby manufacturing a cold rolled steel sheet having a sheet thickness of 0.15 to 0.50 mm;
   carrying out a continuous annealing in which the cold rolled steel sheet is soaked at 810° C. to 850° C. and then cooled; and
   temper-rolling the cold rolled steel sheet that has been continuously annealed at a rolling reduction of 0.5% to 5.0%.

6. The method for manufacturing a cold rolled steel sheet for a drawn can according to claim 5, further comprising:
   carrying out, after the temper rolling, any one of the group consisting of a Ni plating treatment, a Sn plating treatment, and a tinfree steel (TFS) plating treatment on at least one surface of the cold rolled steel sheet.

7. The method for manufacturing a cold rolled steel sheet for a drawn can according to claim 5, further comprising:
   after manufacturing the cold rolled steel sheet and before carrying out the continuous annealing, carrying out a Ni plating treatment in which an adhesion amount of Ni is 9.0 to 27.0 g/m² on at least one surface of the cold rolled steel sheet.

8. The method for manufacturing a cold rolled steel sheet for a drawn can according to claim 5, further comprising:
   after manufacturing the cold rolled steel sheet and before carrying out the continuous annealing, carrying out a Ni plating treatment in which an adhesion amount of Ni is 9.0 to 22.5 g/m² on at least one surface of the cold rolled steel sheet.

9. The method for manufacturing a cold rolled steel sheet for a drawn can according to claim 5,
   wherein, in manufacturing the hot rolled steel sheet, the cast piece is heated at 1,100° C. to 1,230° C. and coiled at 600° C. to 670° C., thereby manufacturing the hot rolled steel sheet.

10. The method for manufacturing a cold rolled steel sheet for a drawn can according to claim 9, further comprising:
    carrying out, after the temper rolling, any one of the group consisting of a Ni plating treatment, a Sn plating treatment, and a tinfree steel (TFS) plating treatment on at least one surface of the cold rolled steel sheet.

11. The method for manufacturing a cold rolled steel sheet for a drawn can according to claim 9, further comprising:
    after manufacturing the cold rolled steel sheet and before carrying out the continuous annealing, carrying out a Ni plating treatment in which an adhesion amount of Ni is 9.0 to 27.0 g/m² on at least one surface of the cold rolled steel sheet.

12. The method for manufacturing a cold rolled steel sheet for a drawn can according to claim 9, further comprising:
    after manufacturing the cold rolled steel sheet and before carrying out the continuous annealing, carrying out a Ni plating treatment in which an adhesion amount of Ni is 9.0 to 22.5 g/m² on at least one surface of the cold rolled steel sheet.

* * * * *